(12) United States Patent  
Ozcan et al.

(10) Patent No.: US 12,657,449 B2  
(45) Date of Patent: Jun. 16, 2026

(54) OPTICAL SYSTEMS AND METHODS USING BROADBAND DIFFRACTIVE NEURAL NETWORKS

(71) Applicant: THE REGENTS OF THE UNIVERSITY OF CALIFORNIA, Oakland, CA (US)

(72) Inventors: Aydogan Ozcan, Los Angeles, CA (US); Yi Luo, Los Angeles, CA (US); Deniz Mengu, Los Angeles, CA (US); Yair Rivenson, Los Angeles, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 1170 days.

(21) Appl. No.: 17/629,346

(22) PCT Filed: Sep. 9, 2020

(86) PCT No.: PCT/US2020/049950  
§ 371 (c)(1),  
(2) Date: Jan. 21, 2022

(87) PCT Pub. No.: WO2021/050550  
PCT Pub. Date: Mar. 18, 2021

(65) Prior Publication Data  
US 2022/0253685 A1 Aug. 11, 2022

Related U.S. Application Data

(60) Provisional application No. 62/900,353, filed on Sep. 13, 2019.

(51) Int. Cl.  
*G06N 3/067* (2006.01)  
*G06N 3/084* (2023.01)

(52) U.S. Cl.  
CPC ............. *G06N 3/067* (2013.01); *G06N 3/084* (2013.01)

(58) Field of Classification Search  
CPC .............................. G06N 3/067; G06N 3/084  
(Continued)

(56) References Cited

U.S. PATENT DOCUMENTS 5,095,459 A 3/1992 Ohta et al.  
5,842,191 A 11/1998 Stearns  
(Continued)

FOREIGN PATENT DOCUMENTS

WO 2019200289 A1 10/2019

OTHER PUBLICATIONS

Russell Pollari, report on Lin, "All-Optical Machine Learning Using Diffractive Deep Neural Networks" Sep. 10, 2018 attached to the present Office action and see also youtube presentation at (https://www.youtube.com/watch?v=64vebcBGiUU (Year: 2018).*  
(Continued)

*Primary Examiner* — Juan A Torres  
(74) *Attorney, Agent, or Firm* — VISTA IP LAW GROUP LLP

(57) ABSTRACT

A broadband diffractive optical neural network simultaneously processes a continuum of wavelengths generated by a temporally-incoherent broadband source to all-optically perform a specific task learned using network learning. The optical neural network design was verified by designing, fabricating and testing seven different multi-layer, diffractive optical systems that transform the optical wavefront generated by a broadband THz pulse to realize (1) a series of tunable, single passband as well as dual passband spectral filters, and (2) spatially-controlled wavelength de-multiplexing. Merging the native or engineered dispersion of various material systems with a deep learning-based design, broad-  
(Continued)

band diffractive optical neural networks help engineer light-matter interaction in 3D, diverging from intuitive and analytical design methods to create task-specific optical components that can all-optically perform deterministic tasks or statistical inference for optical machine learning. The optical neural network may be implemented as a reflective optical neural network.

18 Claims, 13 Drawing Sheets

(58) Field of Classification Search
USPC ................................... 382/158, 156; 706/26
See application file for complete search history.

(56) References Cited

U.S. PATENT DOCUMENTS

| | | | |
|---|---|---|---|
| 6,445,470 B1 | 9/2002 | Jenkins et al. | |
| 6,815,683 B2 | 11/2004 | Federici et al. | |
| 9,459,142 B1 | 10/2016 | Huseynov et al. | |
| 10,187,171 B2* | 1/2019 | Doster ................... | G06N 3/045 |
| 2010/0209830 A1 | 8/2010 | Carcasi et al. | |
| 2012/0262610 A1 | 10/2012 | Rissa et al. | |
| 2014/0067741 A1* | 3/2014 | Katayama ................ | G06N 3/04 |
| | | | 706/27 |
| 2014/0067742 A1 | 3/2014 | Katayama et al. | |
| 2017/0351293 A1 | 12/2017 | Carolan et al. | |
| 2018/0045953 A1 | 2/2018 | Fan et al. | |
| 2018/0262291 A1 | 9/2018 | Doster et al. | |
| 2021/0142170 A1 | 5/2021 | Ozcan et al. | |

OTHER PUBLICATIONS

PCT International Preliminary Report on Patentability (Chapter I of the Patent Cooperation Treaty) for PCT/US2020/049950, Applicant: The Regents of the University of California, Form PCT/IB/326 and 373, dated Mar. 24, 2022 (11 pages).
Bagherian, H. et al., On-Chip Optical Convolutional Neural Networks, arXiv:1808.03303v2 [cs.ET] Aug. 16, 2018.
Brunner, D. et al., Parallel photonic information processing at gigabyte per second data rates using transient states, Nature Communications, 4:1364, DOI: 10.1038/ncomms2368, www.nature.com/naturecommunications (2013).
Bueno, J. et al., Reinforcement Learning in a large scale photonic Recurrent Neural Network, arXiv:1711.05133v2 [cs.NE] Nov. 15, 2017.
Chakraborty, I. et al., Toward Fast Neural Computing using All-Photonic Phase Change Spiking Neurons, arXiv:1804.00267v2 [cs. ET] Aug. 28, 2018.
Chang, J. et al., Hybrid optical-electronic convolutional neural networks with optimized diffractive optics for image classification, Scientific Report (2018) 8:12324, DOI:10.1038/s41598-018-30619-y.
Chen, Y. et al., Deep Learning-Based Classification of Hyperspectral Data, IEEE Journal of Selected Topics in Applied Earth Observations and Remote Sensing, vol. 7, No. 6, Jun. 2014.
Cignoni, P. et al., MeshLab: an Open-Source Mesh Processing Tool, Eurographics Italian Chapter Conference (2008).
Farhat, N. H. et al., Optical implementation of the Hopfield model, May 15, 1985, vol. 24, No. 10, Applied Optics, 1469-1475.
Girshick, R. et al., Rich feature hierarchies for accurate object detection and semantic segmentation Tech report (v5), arXiv:1311. 2524v5 [cs.CV] Oct. 22, 2014.
Golik, P. et al., Cross-Entropy vs. Squared Error Training: a Theoretical and Experimental Comparison, Human Language Technology and Pattern Recognition, Computer Science Department, RWTH Aachen University, 52056 Aachen, Germany (2013).

Grischkowsky, D. et al., Far-infrared time-domain spectroscopy with terahertz beams of dielectrics and semiconductors, J. Opt. Soc. Am. B/vol. 7, No. 10/Oct. 1990.
Hermans, M. etal., Trainable & Dynamic Computing: Error Backpropagation Through Physical Media, arXiv:1407.6637v1 [cs. NE] Jul. 24, 2014.
Hughes, T.W. et al., Training of photonic neural networks through in situ backpropagation, arXiv:1805.09943v1 [physics.optics] May 25, 2018.
Kazhdan, M. et al., Screened Poisson Surface Reconstruction, ACM Transactions on Graphics, vol. VV, No. N, Article XXX, Publication date: 2013.
Khorasaninejad, M. et al., Metalenses at visible wavelengths: Diffraction-limited focusing and subwavelength resolution imaging, sciencemag. org, Science, Jun. 3, 2016, vol. 352, Issue 6290, 1190-1194.
Kildishev, A. V. et al., Planar Photonics with Metasurfaces, Science 339, 1232009 (2013). DOI: 10.1126/science.1232009.
Kingma, D. P. et al., ADAM: a Method for Stochastic Optimization, arXiv:1412.6980v9 [cs.LG] Jan. 30, 2017.
Lecun, Y. et al., GradientBased Learning Applied to Document Recognition, Proc. of the IEEE, Nov. 1998 (46 pages).
Lin, X. et al., All-optical machine learning using diffractive deep neural networks, Science 361, 1004-1008 (2018), Sep. 7, 2018.
Psaltis, D. et al., Optical information processing based on an associative-memory model of neural nets with thresholding and feedback, Optics Letters, vol. 10, No. 2, Feb. 1985.
Psaltis, D. et al., Adaptive optical networks using photorefractive crystals, Applied Optics, vol. 27, No. 9, May 1, 1988.
Shastri, B. et al., Principles of Neuromorphic Photonics, arXiv:1801. 00016v1 [cs.ET] Dec. 29, 2017.
Shen, Y. et al., Deep Learning with Coherent Nanophotonic Circuits, arXiv:1610.02365v1 [physics.optics] Oct. 7, 2016.
Srivastava, N. et al., Dropout: A Simple Way to Prevent Neural Networks from Overfitting, Journal of Machine Learning Research 15 (2014) 1929-1958 Submitted Nov. 2013; Published Jun. 2014.
Tang, Y. et al., Deep Learning using Linear Support Vector Machines, arXiv:1306.0239v4 [cs.LG] Feb. 21, 2015.
Trabelsi, C. et al., Deep Complex Networks, arXiv:1705.09792v4 [cs.NE] Feb. 25, 2018.
Wagner, K. et al., Multilayer optical learning networks, Dec. 1, 1987, vol. 26, No. 23, Applied Optics, 5061-5076.
Wan, Li et al., Regularization of Neural Networks using DropConnect, Proceedings of the 30 th International Conference on Machine Learning, Atlanta, Georgia, USA, 2013.
Wang, Z. et al., Image Quality Assessment: From Error Visibility to Structural Similarity, IEEE Transactions on Image Processing, vol. 13, No. 4, Apr. 2004.
Weverka, R. T. et al., Fully interconnected, two-dimensional neural arrays using wavelength-multiplexed volume holograms, Optics Letters, vol. 16, No. 11, Jun. 1, 1991.
Xiao, Y. et al., Nonlinear Metasurface Based on Giant Optical Kerr Response of Gold Quantum Wells, ACS Photonics, 5(5), May 1, 2018, DOI:10.1021/acsphotonics.7b01140.
Yin, X. et al., Artificial Kerr-type medium using metamaterials, Apr. 9, 2012, vol. 20, No. 8, Optics Express, 8543-8550.
PCT International Search Report for PCT/US2019/027275, Applicant: The Regents of the University of California, Form PCT/ISA/210 and 220, dated Aug. 19, 2019 (5 pages).
PCT Written Opinion of the International Search Authority for PCT/US2019/027275, Applicant: The Regents of the University of California, Form PCT/ISA/237, dated Aug. 19, 2019 (9 pages).
Javidi, B. et al., Optical implementation of neural networks for face recognition by the use of nonlinear joint transform correlators, Applied Optics, vol. 34, No. 20, Jul. 10, 1995, 3950-3962.
Jutamulia, S. et al., Overview of hybrid optical neural networks, Optics & Laser Technology, vol. 28, No. 2, pp. 59-72, 1996.
Psaltis, D. et al., Holography in artificial neural networks. Nature. 343, 325-330 (1990).
Soures, N. et al., Neuro-MMI: A Hybrid Photonic-Electronic Machine Learning Platform. In 2018 IEEE Photonics Society Summer Topical Meeting Series (SUM); 2018; pp. 187-188.

(56) References Cited

OTHER PUBLICATIONS

Yu, F. T. S., II Optical Neural Networks: Architecture, Design and Models. In Progress in Optics; Wolf, E., Ed.; Elsevier, 1993; vol. 32, pp. 61-144.

Yu, F. et al., Flat optics with designer metasurfaces. Nature Materials. 13, 139-150 (2014).

Caulfield, H.J. et al., Optical Neural Networks. Proc. IEEE 1989, 77 (10), 1573-1583.

PCT International Preliminary Report on Patentability (Chapter I of the Patent Cooperation Treaty) for PCT/US2019/027275, Applicant: The Regents of the University of California, Form PCT/IB/326 and 373, dated Oct. 22, 2020 (11 pages).

Sara Abrahamsson et al., Multifocus microscopy with precise color multi-phase diffractive optics applied in functional neuronal imaging, Biomedical Optics Express, Mar. 1, 2016, vol. 7, No. 3, 855-869.

Francesco Aieta et al., Multiwavelength achromatic metasurfaces by dispersive phase compensation, sciencemag.org Science, Mar. 20, 2015, vol. 347, Issue 6228, 1342-1345.

Sourangsu Banerji et al., A Computational Design Framework for Efficient, Fabrication Error-Tolerant, Planar THz Diffractive Optical Elements, Scientific Reports, (2019) 9:5801, https://doi.org/10.1038/s41598-019-42243-5.

Julie Chang et al., Hybrid optical-electronic convolutional neural networks with optimized diffractive optics for image classification, Scientific Reports, (2018) 8:12324; DOI:10.1038/s41598-018-30619-y.

Nicholas J. Karl et al., Frequency-division multiplexing in the terahertz range using a leaky-wave antenna, Nature Photonics, vol. 9, Nov. 2015, 717-721, www.nature.com/naturephotonics.

Diederik P. Kingma et al., Auto-Encoding Variational Bayes, arXiv: 1312.6114v10 [stat.ML] May 1, 2014.

Iñigo Liberal et al., Reconfigurable epsilon-near-zero metasurfaces via photonic doping, Nanophotonics 2018; 7(6): 1117-1127.

Jingxi Li et al., Class-specific Differential Detection in Diffractive Optical Neural Networks Improves Inference Accuracy (2019) (21 pages).

Xing Lin et al., All-optical machine learning using diffractive deep neural networks, Science 361, 1004-1008 (2018).

Yi Luo et al., Design of task-specific optical systems using broadband diffractive neural networks, Light: Science & Applications ( 2019) 8:112.

Shuming Wang et al., Broadband achromatic optical metasurface devices, Nature Communications, 8:187, DOI: 10.1038/s41467-017-00166-7 | www.nature.com/naturecommunications, (2017).

Yi Luo et al., Design of Task-Specific Optical Systems Using Broadband Diffractive Neural Networks, Light: Science & Applications. Dec. 2, 2019;8(1):1-4.

Deniz Mengu et al., Analysis of Diffractive Optical Neural Networks and Their Integration with Electronic Neural Networks, IEEE Journal of Selected Topics in Quantum Electronics, vol. 26, No. 1, Jan./Feb. 2020 (14 pages).

PCT International Search Report for PCT/US2020/049950, Applicant: The Regents of the University of California, Form PCT/ISA/ 210 and 220, dated Nov. 30, 2020 (4 pages).

PCT Written Opinion of the International Search Authority for PCT/US2020/049950, Applicant: The Regents of the University of California, Form PCT/ISA/237, dated Nov. 30, 2020 (9 pages).

* cited by examiner

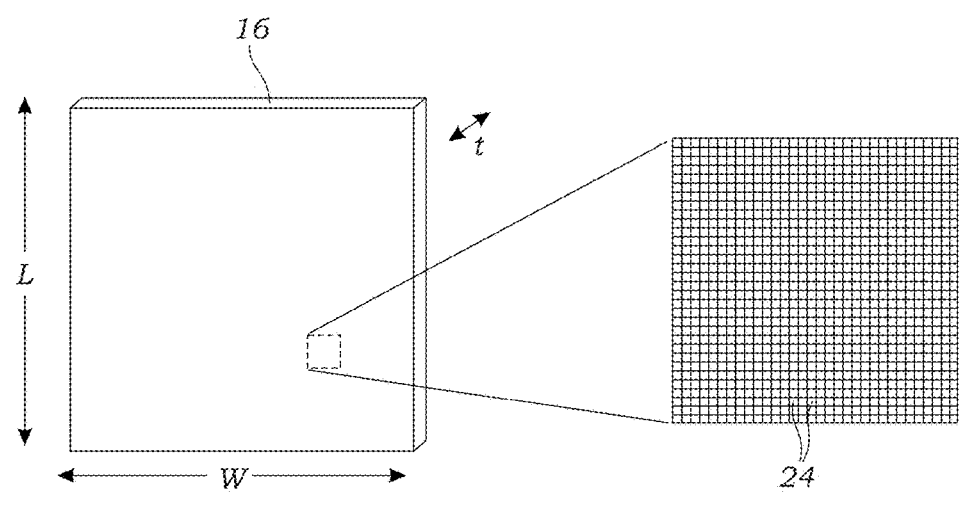
FIG. 3
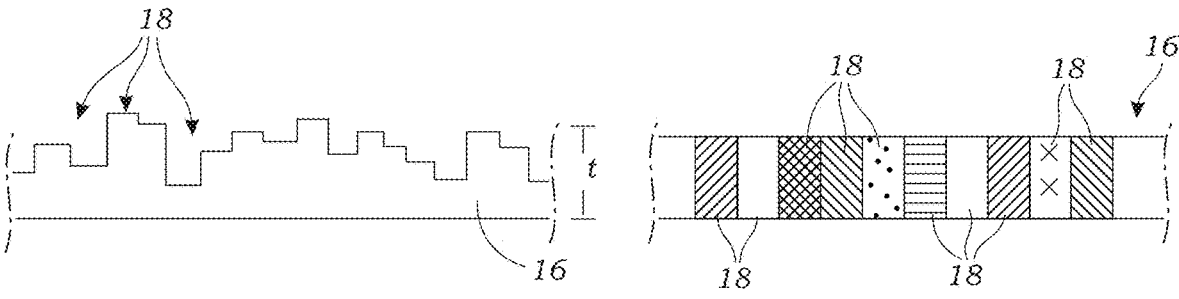
FIG. 4                  FIG. 5
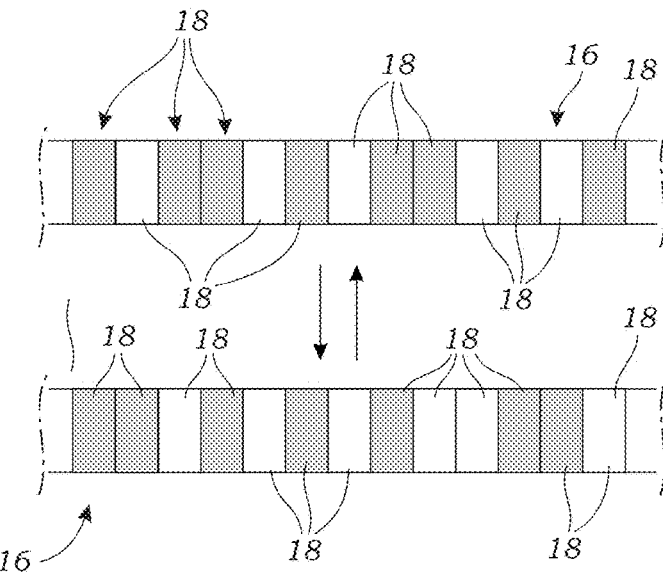
FIG. 6

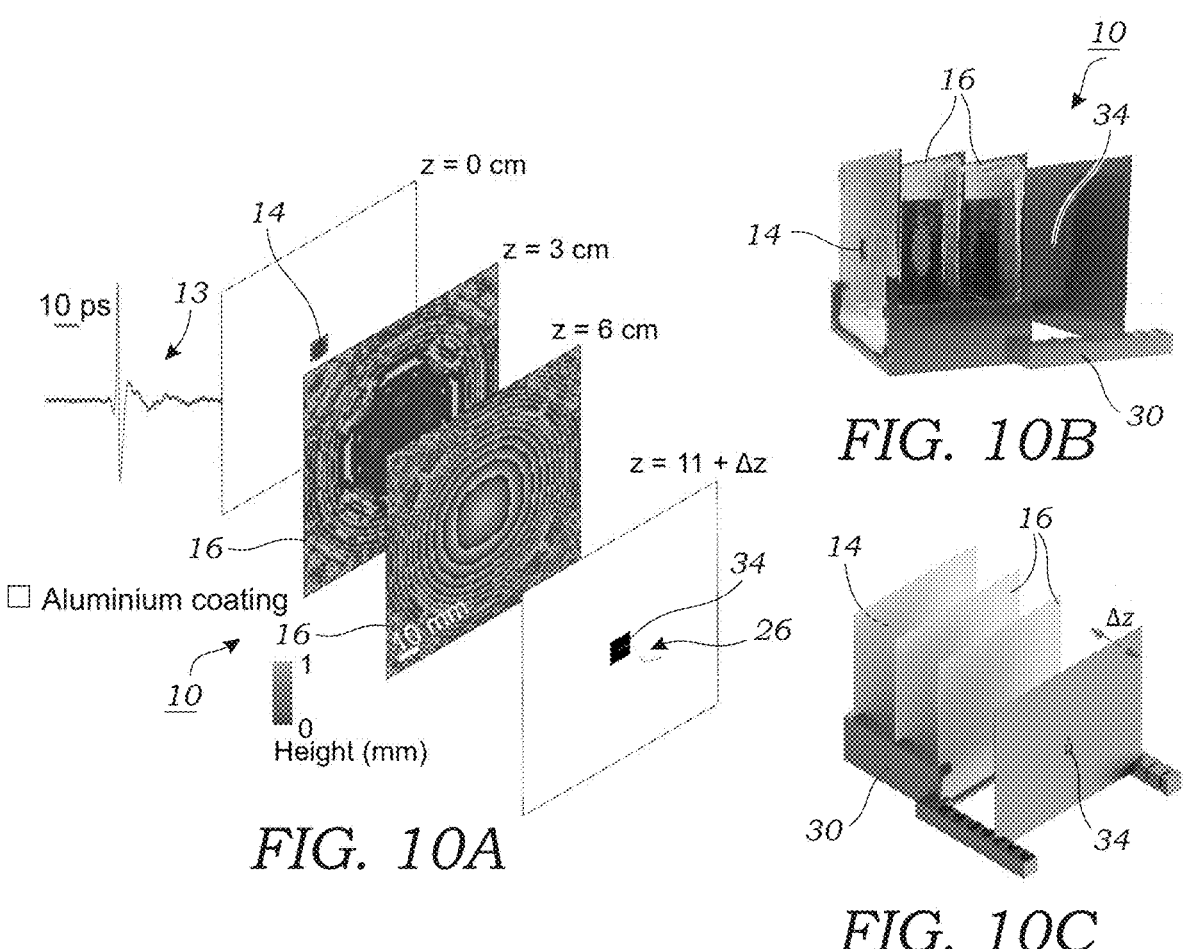
*FIG. 10A*
*FIG. 10B*
*FIG. 10C*
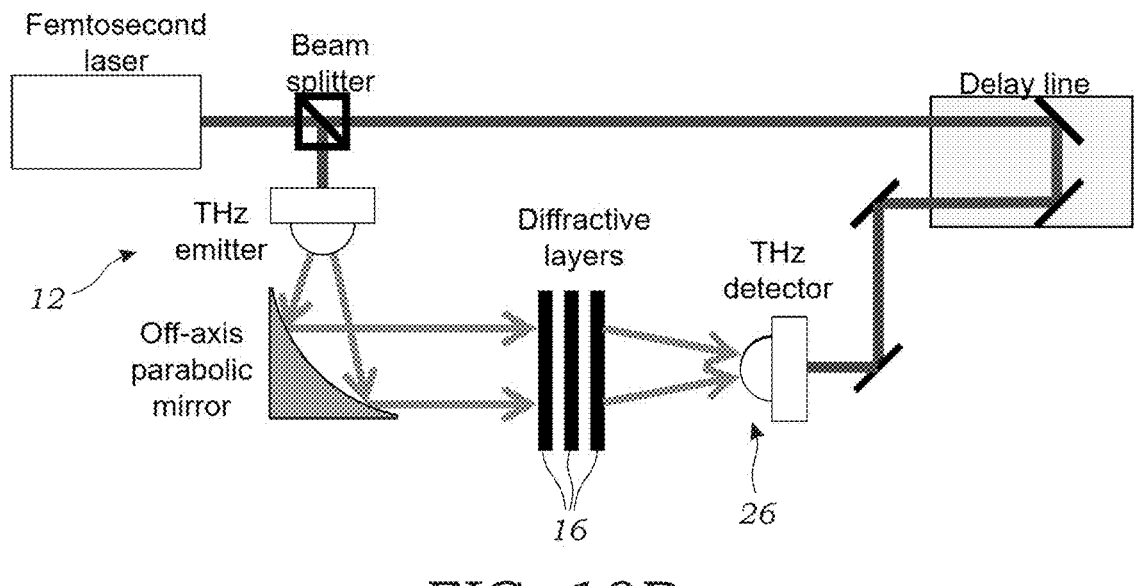
*FIG. 10D*

Layer 1          Layer 2          Layer 3

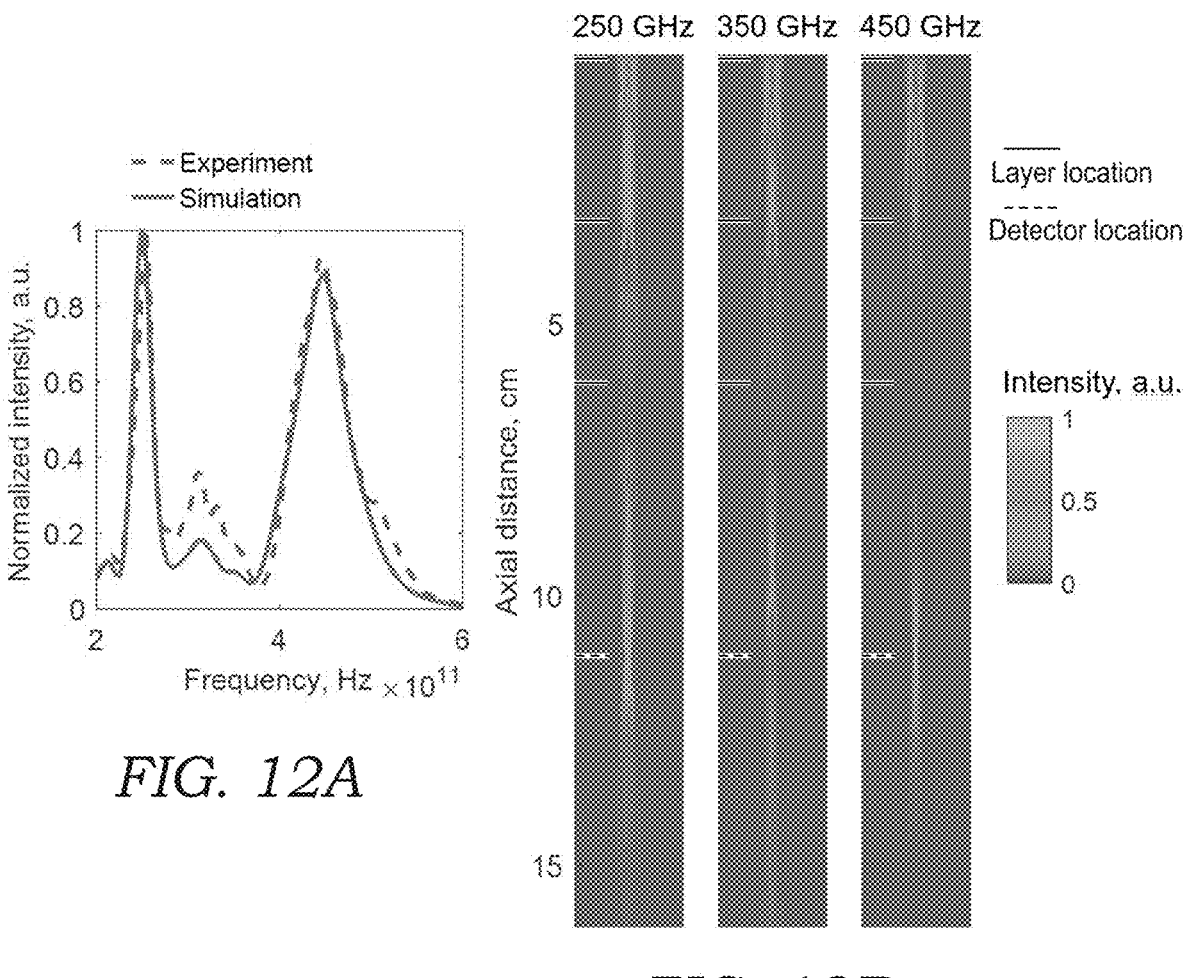
FIG. 12A
FIG. 12B
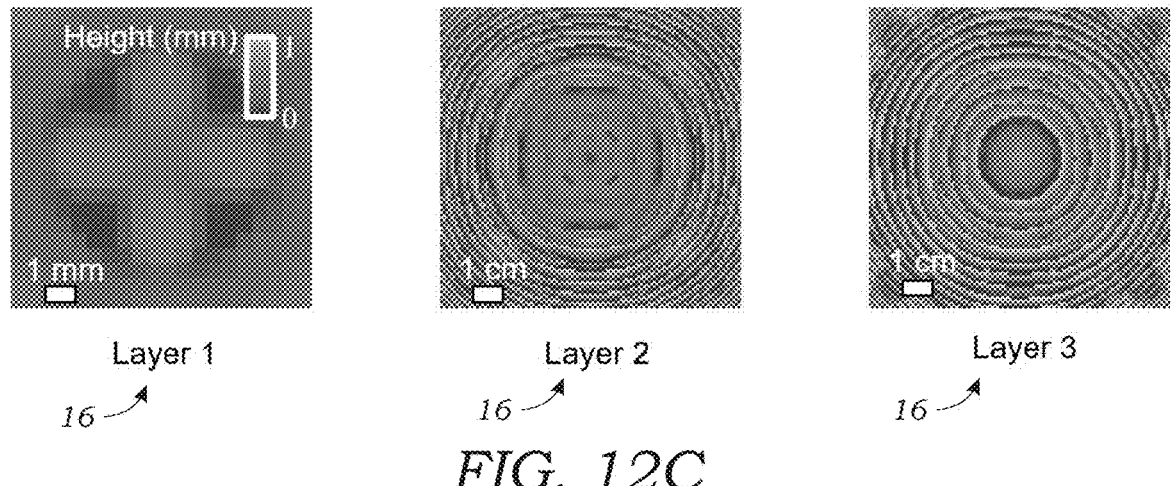
FIG. 12C

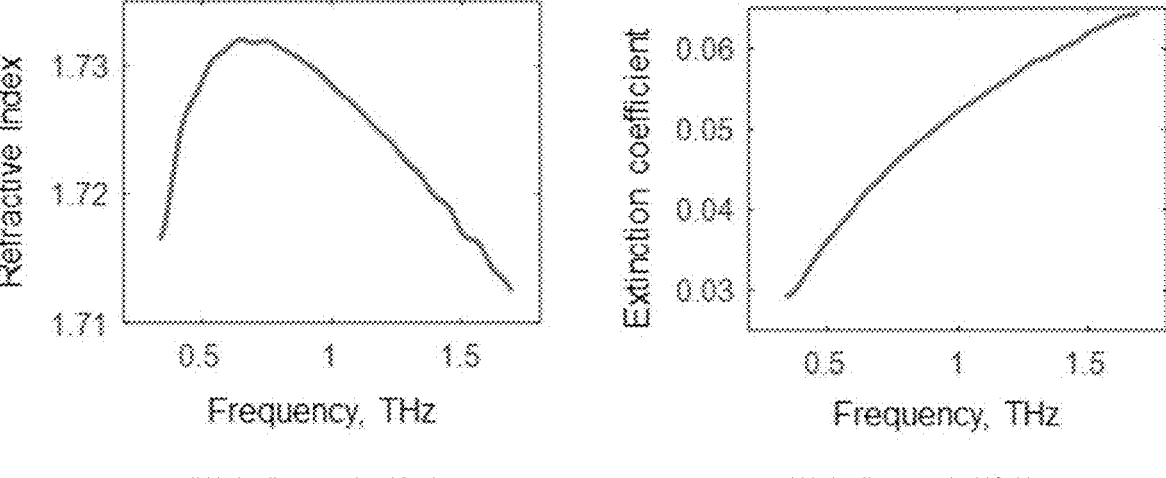
FIG. 15A                    FIG. 15B
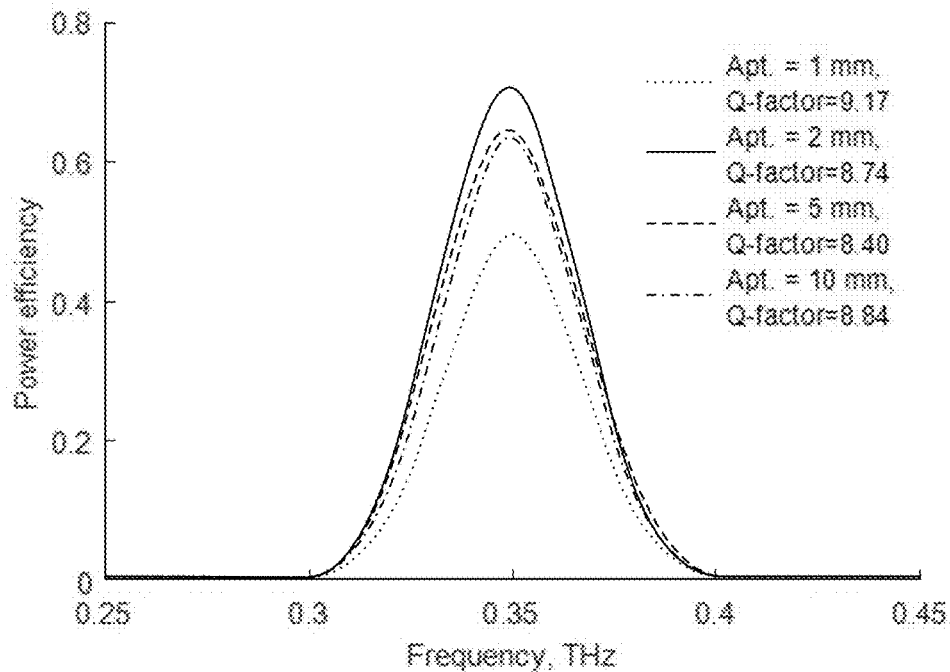
FIG. 16

OPTICAL SYSTEMS AND METHODS USING BROADBAND DIFFRACTIVE NEURAL NETWORKS

RELATED APPLICATION

This application is a U.S. National Stage filing under 35 U.S.C. § 371 of International Application No. PCT/US2020/049950, filed on Sep. 9, 2020, which claims priority to U.S. Provisional Patent Application No. 62/900,353 filed on Sep. 13, 2019, which are hereby incorporated by reference in its entirety. Priority is claimed pursuant to 35 U.S.C. §§ 119, 371 and any other applicable statute.

TECHNICAL FIELD

The technical field generally relates to an optical deep learning physical architecture or platform that can perform, at the speed of light, various complex functions. In particular, the technical field relates to a broadband diffractive optical neural network design that simultaneously processes a continuum of wavelengths generated by a temporally-incoherent broadband source to all-optically perform a specific task or operation learned using deep learning. The specific tasks of spectral filtering and spatially-controlled wavelength de-multiplexing are illustrated.

BACKGROUND

Deep learning has been redefining the state-of-the-art results in various fields, such as image recognition, natural language processing and semantic segmentation. The optics community has also benefited from deep learning methods in various applications such as microscopic imaging and holography, among many others. Aside from optical imaging, deep learning and related optimization tools have recently been utilized for solving inverse problems in optics related to e.g., nanophotonic designs and nanoplasmonics. These successful demonstrations and many others have also inspired a resurgence on the design of optical neural networks and other optical computing techniques motivated by their advantages in terms of parallelization, scalability, power efficiency and computation speed. A recent addition to this family of optical computing methods is Diffractive Deep Neural Networks (D²NN) which are based on light-matter interaction engineered by successive diffractive layers, designed in a computer by deep learning methods such as error backpropagation and stochastic gradient descent. Once the training phase is finalized, the diffractive optical network that is composed of transmissive and/or reflective layers is physically fabricated using e.g., 3D printing or lithography. Each diffractive layer consists of elements (termed as neurons) that modulate the phase and/or amplitude of the incident beam at their corresponding location in space, connecting one diffractive layer to successive ones through spherical waves based on the Huygens-Fresnel principle. Using a spatially and temporally coherent illumination, these neurons at different layers collectively compute the spatial light distribution at the desired output plane based on a given task that is learned. Diffractive optical neural networks designed using this framework and fabricated by 3D printing were experimentally demonstrated to achieve all-optical inference and data generalization for object classification, a fundamental application in machine learning. Overall, multi-layer diffractive neural networks have been shown to improve their blind testing accuracy, diffraction efficiency and signal contrast with additional diffractive layers, exhibiting depth advantage even using linear optical materials. In all these previous studies on diffractive optical networks, the input light was both spatially and temporally coherent, i.e., utilized a monochromatic plane wave at the input.

In general, diffractive optical networks with multiple layers enable generalization and perform all-optical blind inference on new input data (never seen by the network before), beyond the deterministic capabilities of the previous diffractive surfaces that were designed using different optimization methods to provide wavefront transformations without any data generalization capability. These previous demonstrations cover a variety of applications over different regions of the electromagnetic spectrum, providing unique capabilities compared to conventional optical components that are designed by analytical methods. While these earlier studies revealed the potentials of single-layer designs using diffractive surfaces under temporally-coherent radiation, the extension of these methods to broadband designs operating with a continuum of wavelengths has been a challenging task. Operating at a few discrete wavelengths, different design strategies have been reported using single-layer phase elements based on composite materials and thick layouts covering multiple $2\pi$ modulation cycles. In a recent work, a low numerical aperture (NA~0.01) broadband diffractive cylindrical lens design has also been demonstrated. In addition to diffractive elements, metasurfaces also present engineered optical responses devised through densely packed subwavelength resonator arrays which control their dispersion behavior. Recent advances in metasurfaces enabled several broadband, achromatic lens designs for e.g., imaging applications. On the other hand, the design space of broadband optical components that process a continuum of wavelengths relying on these elegant techniques have been restrained to single-layer architectures, mostly with an intuitive analytical formulation of the desired surface function.

SUMMARY

In one embodiment, a broadband diffractive optical network framework (i.e., an optical neural network) is disclosed that unifies deep learning methods with the angular spectrum formulation of broadband light propagation and the material dispersion properties in order to design task-specific optical components through 3D-engineering of light-matter interaction. Designed initially using software executed by a computing device, a physical broadband diffractive optical network is then fabricated in accordance with the computationally derived design. After its fabrication, one can process a continuum of input wavelengths (i.e., from a broadband light source) all in parallel, and perform a learned task at its output plane (e.g., filtering or de-multiplexing), resulting from the diffraction of broadband light through multiple layers. The success of broadband diffractive optical networks is demonstrated experimentally by designing, fabricating and testing different types of optical components using a broadband THz pulse as the input source.

In exemplary embodiments, first, a series of single passband as well as dual passband spectral filters are demonstrated, where each design used three diffractive layers fabricated by 3D printing, experimentally tested. A classical tradeoff between the Q-factor and the power efficiency was observed and it was demonstrated that the diffractive neural network framework can control and balance these design parameters on demand, i.e., based on the selection of the diffractive network training loss function. Combining the spectral filtering operation with spatial multiplexing, spatially-controlled wavelength de-multiplexing was demonstrated using three (3) diffractive layers that are trained to de-multiplex a broadband input source onto four (4) output apertures located at the output plane of the diffractive network, where each aperture has a unique target passband. The experimental results obtained with these different diffractive optical networks that were 3D printed provided a very good fit to the trained diffractive models.

The broadband diffractive optical neural networks provide a powerful framework for merging the dispersion properties of various material systems with deep learning methods in order to engineer light-matter interaction in 3D and help to create task-specific optical components that can perform deterministic tasks as well as statistical inference and data generalization. The presented device and methods can be further empowered by various metamaterial designs, as part of the layers of a diffractive optical network, and bring additional degrees of freedom by engineering and encoding the dispersion of the fabrication materials to further improve the performance of broadband diffractive networks.

In one embodiment, an optical neural network device is disclosed for processing a broadband input optical signal from a broadband light source. The optical neural network includes a plurality of optically transmissive and/or reflective substrate layers arranged in an optical path, each of the plurality of optically transmissive and/or reflective substrate layers comprising a plurality of physical features formed on or within the plurality of optically transmissive or reflective substrate layers and having different complex-valued transmission and/or reflection coefficients as a function of the lateral coordinates across each substrate layer, wherein the plurality of optically transmissive and/or reflective substrate layers and the plurality of physical features thereon collectively define a trained mapping function between the broadband input optical signal to the plurality of optically transmissive and/or reflective substrate layers and one or more output optical signal(s) created by optical diffraction through and/or optical reflection from the plurality of optically transmissive and/or reflective substrate layers. The optical neural network includes one or more optical sensors configured to capture the one or more output optical signal(s) resulting from the plurality of optically transmissive and/or reflective substrate layers.

In another embodiment, an optical neural network device for processing an input optical signal having multiple distinct channels includes a plurality of optically transmissive and/or reflective substrate layers arranged in an optical path, each of the plurality of optically transmissive and/or reflective substrate layers comprising a plurality of physical features formed on or within the plurality of optically transmissive or reflective substrate layers and having different complex-valued transmission and/or reflection coefficients as a function of the lateral coordinates across each substrate layer, wherein the plurality of optically transmissive and/or reflective substrate layers and the plurality of physical features thereon collectively define a trained mapping function between the input optical signal to the plurality of optically transmissive and/or reflective substrate layers and one or more output optical signal(s) comprising one or more multiplexed channel(s) created by optical diffraction through and/or optical reflection from the plurality of optically transmissive and/or reflective substrate layers. The optical neural network further includes one or more optical sensors configured to capture the one or more output optical signal(s) resulting from the plurality of optically transmissive and/or reflective substrate layers.

In another embodiment, a method of forming a multi-layer optical neural network for processing broadband light includes training a software-based neural network to perform one or more specific optical functions for a multi-layer transmissive and/or reflective network having a plurality of optically diffractive physical features located in different locations in each of the layers of the transmissive and/or reflective network, wherein the training comprises feeding a plurality of different wavelengths of a broadband optical signal to the software-based neural network and computing at least one optical output of optical transmission and/or reflection through the multi-layer transmissive and/or reflective network using a wave propagation model and iteratively adjusting complex-valued transmission/reflection coefficients for each layer of the multi-layer transmissive and/or reflective network until optimized transmission/reflection coefficients are obtained or a certain time or epochs have elapsed; and manufacturing or having manufactured a physical embodiment of the multi-layer transmissive and/or reflective network comprising a plurality of substrate layers having physical features that match the optimized transmission/reflection coefficients obtained by the trained neural network.

In another embodiment, a method of filtering or de-multiplexing a broadband input optical signal includes providing an optical neural network device that is formed from a plurality of optically transmissive and/or reflective substrate layers arranged in an optical path, each of the plurality of optically transmissive and/or reflective substrate layers comprising a plurality of physical features formed on or within the plurality of optically transmissive or reflective substrate layers and having different complex-valued transmission and/or reflection coefficients as a function of the lateral coordinates across each substrate layer, wherein the plurality of optically transmissive and/or reflective substrate layers and the plurality of physical features thereon collectively define a trained mapping function between the broadband input optical signal to the plurality of optically transmissive and/or reflective substrate layers and one or more output optical signal(s) created by optical diffraction through and/or optical reflection from the plurality of optically transmissive and/or reflective substrate layers. The optical neural network device further includes one or more optical sensors configured to capture the one or more output optical signal(s) resulting from the plurality of optically transmissive and/or reflective substrate layers. The broadband input optical signal is input to the optical neural network.

In another embodiment, a method of processing an input optical signal having multiple distinct channels includes providing an optical neural network device that is formed from a plurality of optically transmissive and/or reflective substrate layers arranged in an optical path, each of the plurality of optically transmissive and/or reflective substrate layers comprising a plurality of physical features formed on or within the plurality of optically transmissive or reflective substrate layers and having different complex-valued transmission and/or reflection coefficients as a function of the lateral coordinates across each substrate layer, wherein the plurality of optically transmissive and/or reflective substrate layers and the plurality of physical features thereon collectively define a trained mapping function between the input optical signal to the plurality of optically transmissive and/or reflective substrate layers and one or more output optical signal(s) comprising one or more multiplexed channel(s) created by optical diffraction through and/or optical reflection from the plurality of optically transmissive and/or reflective substrate layers. The optical neural network device further includes one or more optical sensors configured to capture the one or more output optical signal(s) resulting from the plurality of optically transmissive and/or reflective substrate layers. The input optical signal having multiple distinct channels is input into the optical neural network.

BRIEF DESCRIPTION OF THE DRAWINGS

FIG. 3 illustrates a single substrate layer of an optical neural network. The substrate layer may be made from a material that is optically transmissive (for transmission mode such as illustrated in FIG. 1) or an optically reflective material (for reflective mode as illustrated in FIG. 2). The substrate layer, which may be formed as a substrate or plate in some embodiments, has surface features formed across the substrate layer. The surface features form a patterned surface (e.g., an array) having different complex-valued transmission (or reflection) coefficients as a function of lateral coordinates across each substrate layer. These surface features act as artificial "neurons" that connect to other "neurons" of other substrate layers of the optical neural network through optical diffraction (or reflection) and alter the phase and/or amplitude of the light wave.

FIG. 4 schematically illustrates a cross-sectional view of a single substrate layer of an optical neural network according to one embodiment. In this embodiment, the surface features are formed by adjusting the thickness of the substrate layer that forms the optical neural network. These different thicknesses may define peaks and valleys in the substrate layer that act as the artificial "neurons."

FIG. 5 schematically illustrates a cross-sectional view of a single substrate layer of an optical neural network according to another embodiment. In this embodiment, the different surface features are formed by altering the material composition or material properties of the single substrate layer at different lateral locations across the substrate layer. This may be accomplished by doping the substrate layer with a dopant or incorporating other optical materials into the substrate layer. Metamaterials or plasmonic structures may also be incorporated into the substrate layer.

FIG. 6 schematically illustrates a cross-sectional view of a single substrate layer of an optical neural network according to another embodiment. In this embodiment, the substrate layer is reconfigurable in that the optical properties of the various artificial neurons may be changed, for example, by application of a stimulus (e.g., electrical current or field). An example includes spatial light modulators (SLMs) which can change their optical properties. In this embodiment, the neuronal structure is not fixed and can be dynamically changed or tuned as appropriate (i.e. changed on demand).

This embodiment, for example, can provide a learning optical neural network or a changeable optical neural network that can be altered on-the-fly (e.g., over time) to improve the performance, compensate for aberrations, or even change another task.

Figure 7:
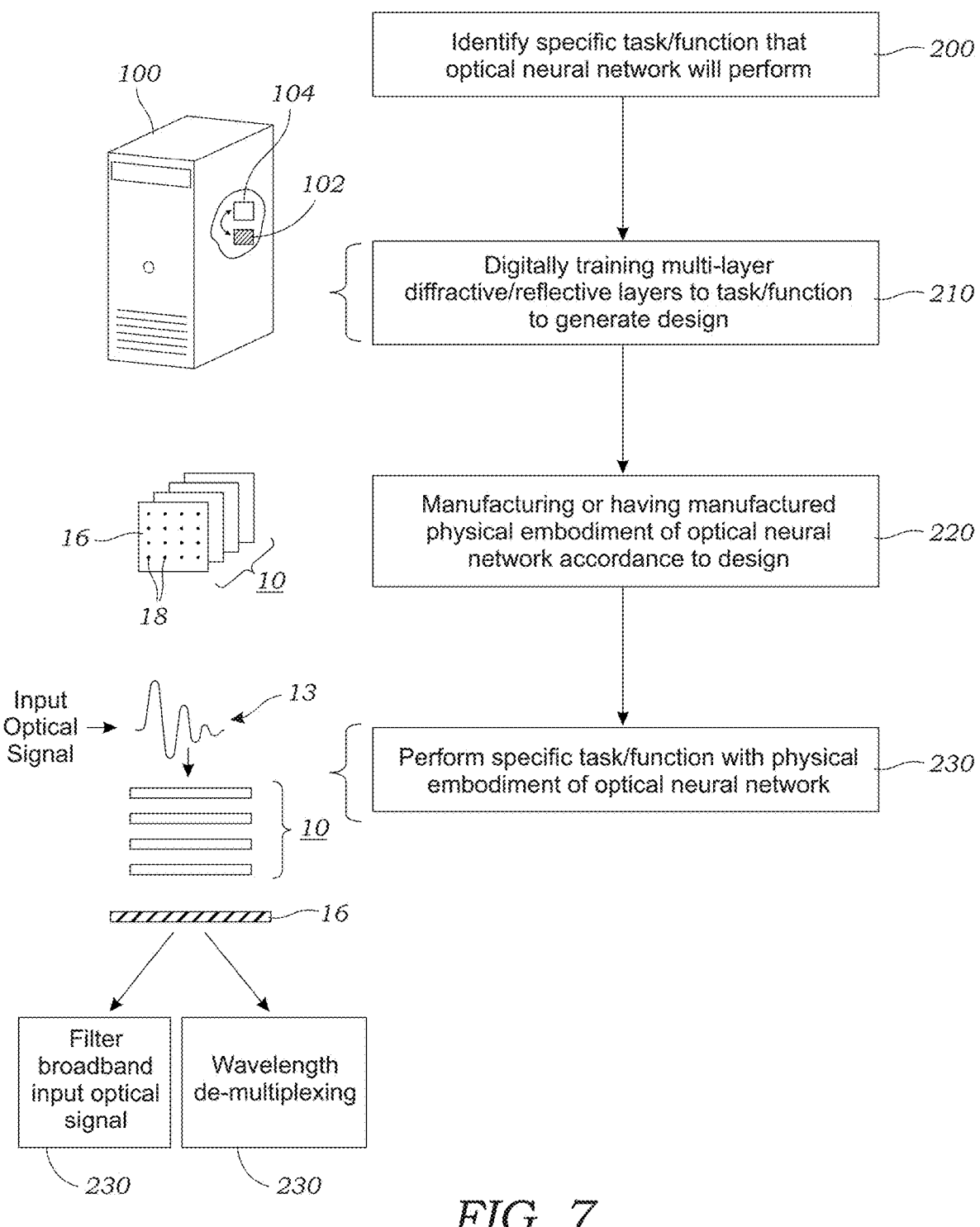

FIG. 7 illustrates a flowchart of the operations according to one embodiment to create and use an optical neural network.

Figure 8:
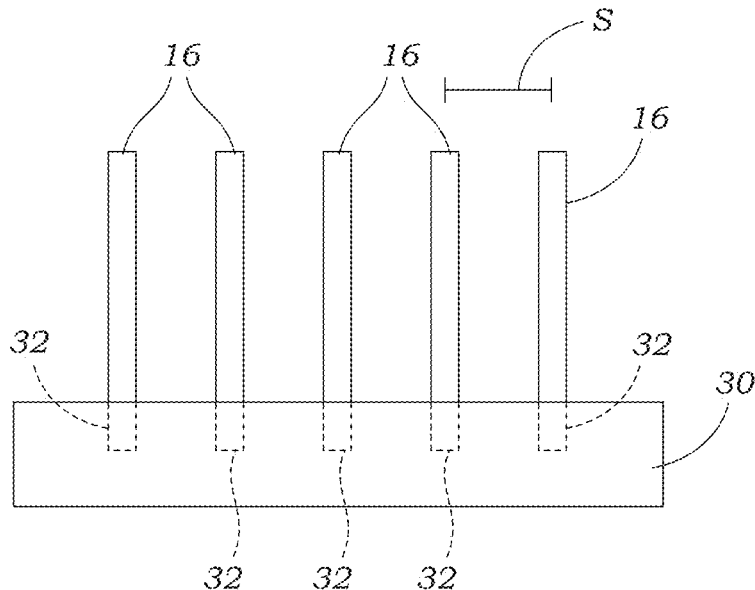

FIG. 8 illustrates an embodiment of a holder that is used to secure the substrate layers used in an optical neural network.

Figures 9A, 9B, 9C:
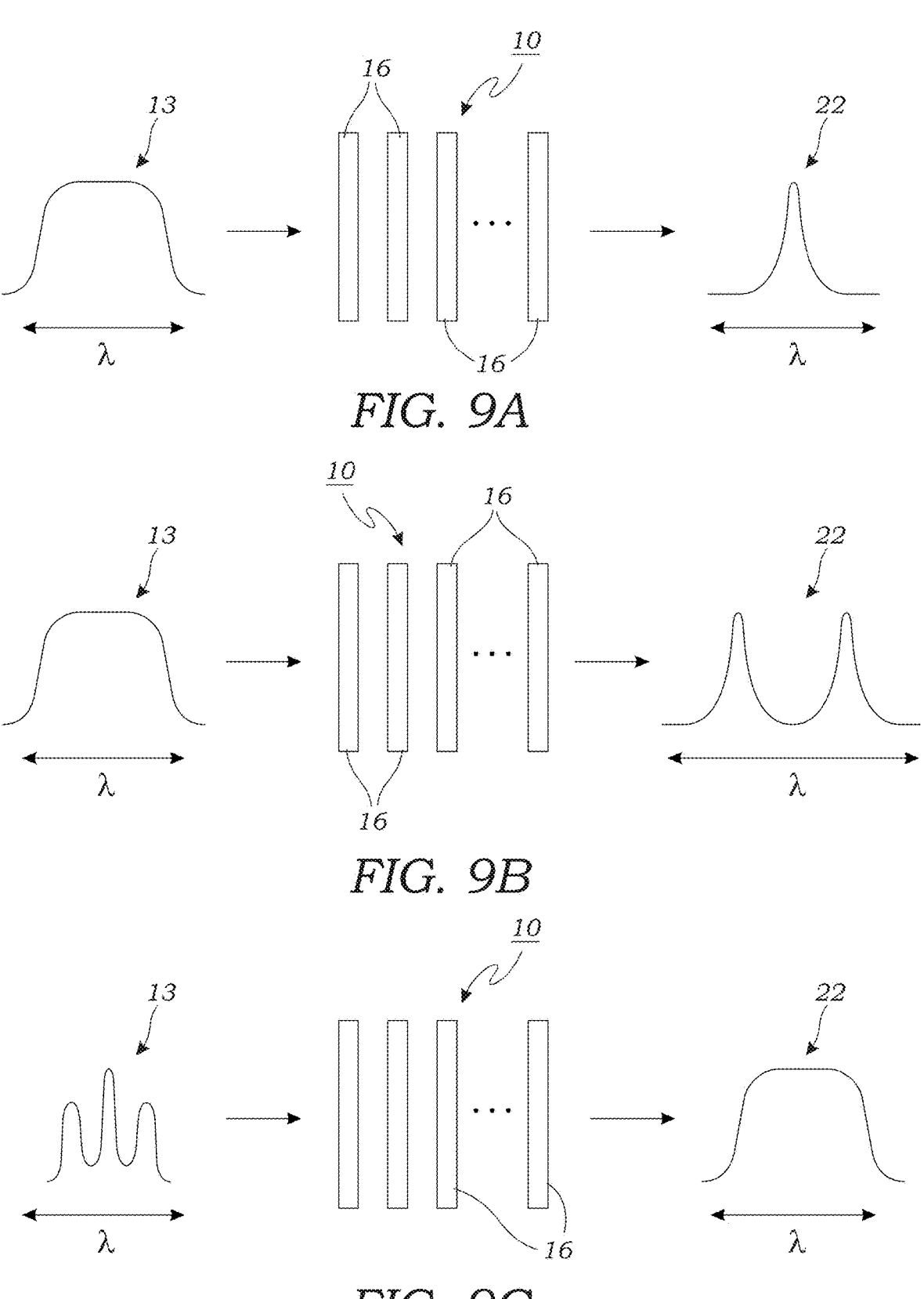

FIG. 9A schematically illustrate an embodiment of an optical neural network that is used to process input broadband light into an output light signal that is filtered.

FIG. 9B schematically illustrate an embodiment of an optical neural network that is used to process input broadband light into an output light signal that is demultiplexed.

FIG. 9C schematically illustrate an embodiment of an optical neural network that is used to process input light signal that is filtered or de-multiplexed (i.e., multiple input channels) into an output that is a single common multiplexed channel.

FIGS. 10A-10D: Schematic of spectral filter design using broadband diffractive neural networks and the experimental set-up. FIG. 10A schematically illustrates a diffractive neural network-based design of a spectral filter. FIG. 10B illustrates a photograph of the physically fabricated diffractive filter design shown in FIG. 10A. The diffractive layers are 3D printed over a surface that is larger than their active (i.e., beam modulating) area to avoid bending of the layers. These extra regions do not modulate the light and are covered by aluminum, preventing stray light in the system. The active area of the first diffractive layer is 1 cm×1 cm, while the other layers have active areas of 5 cm×5 cm. FIG. 10C illustrates the physical layout of the spectral filters with three (3) diffractive layers and an output aperture (2 mm×2 mm). FIG. 10D schematically illustrates the experimental optical setup used herein. Solid lines indicate the optical path of the femtosecond pulses generated by a Ti:Sapphire laser at 780 nm wavelength, which was used as the pump for the THz emitter and detector. Dashed lines depict the optical path of the THz pulse (peak frequency ~200 GHz, observable bandwidth ~5 THz) that is modulated and spectrally filtered by the designed diffractive neural networks.

Figures 11A, 11B, 11C, 11D, 11E:
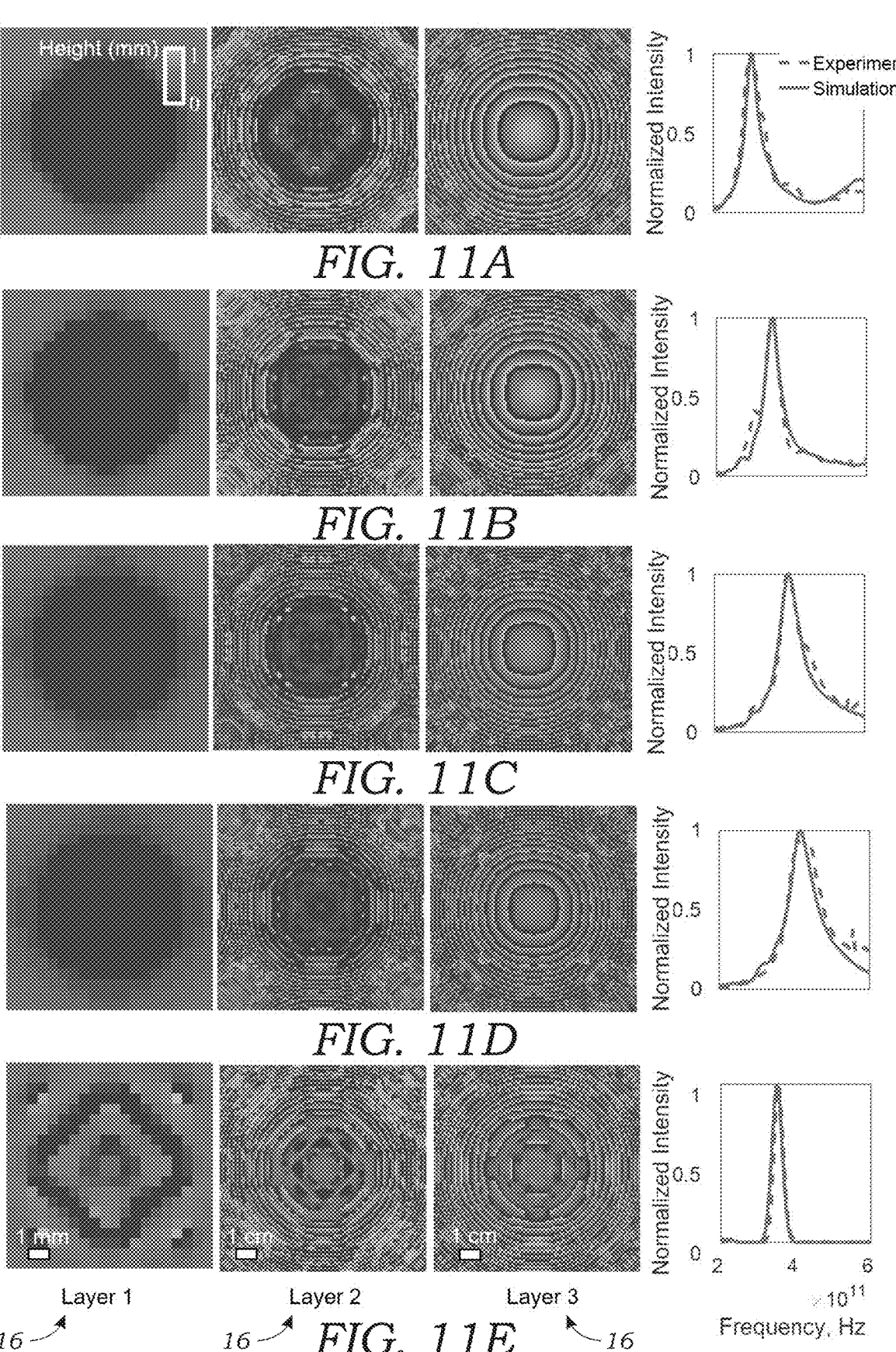

FIGS. 11A-11E: Single passband spectral filter designs using broadband optical neural networks and their experimental validation. FIGS. 11A-11D show optimized/learned thickness profiles of three (3) diffractive layers along with the corresponding simulated (solid) and experimentally measured (dashed) spectral responses. (FIG. 11A) 300 GHz, (FIG. 11B) 350 GHz, (FIG. 11C) 400 GHz and (FIG. 101) 420 GHz filters. These four (4) spectral filters were designed to favor power efficiency over Q-factor by setting $\beta=0$ in Equation (8). FIG. 11E is the same as in (FIG. 11B) except that the targeted spectral profile is a Gaussian with a Q-factor of 10, which was enforced during the training phase of the network by setting $\alpha/\beta=0.1$ in Equation (8). All these 5 diffractive neural networks were 3D-printed after their design and were experimentally tested using the set-up in FIGS. 10A-10D. The small residual peaks at around ~0.55 THz observed in the experimental results are due to the water absorption lines in air, which were not taken into account in the numerical forward model.

FIGS. 12A-12C: Dual passband spectral filter design using an optical neural network and its experimental validation. FIG. 12A shows the simulated (solid) and the experimentally observed (dashed) spectra of the diffractive network design. The center frequencies of the two target bands are 250 GHz and 450 GHz. FIG. 12B shows the projection of the spatial intensity distributions created by the 3-layer design on the xz plane (at y=0) for 250 GHz, 350 GHz and 450 GHz. FIG. 12C illustrates the learned thickness profiles of the three (3) diffractive layers of the network design. This broadband diffractive neural network design was 3D-printed and experimentally tested using the set-up in FIGS. 10A-10D.

Figures 13A, 13B, 13C:
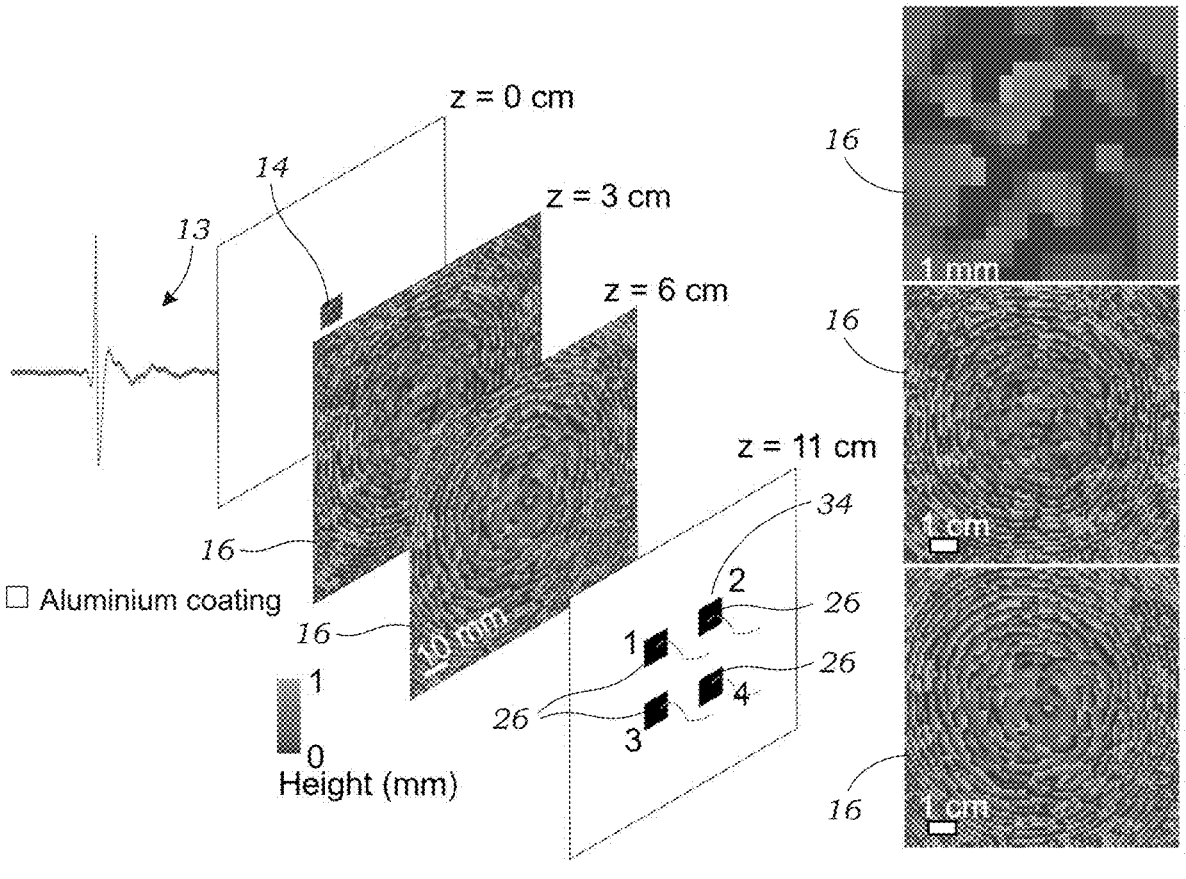

FIGS. 13A-13C: Broadband diffractive neural network design for spatially-controlled wavelength de-multiplexing and its experimental validation. FIG. 13A shows the physical layout of the 3-layer diffractive optical network model that channels four (4) spectral passbands around 300 GHz, 350 GHz, 400 GHz and 450 GHz onto four (4) different corresponding apertures at the output plane of the network. FIG. 13B shows the thickness profiles of the three (3) diffractive layers that are learned, forming the diffractive network model. This broadband diffractive neural network design was 3D-printed and experimentally tested using the set-up in FIGS. 10A-10D. FIG. 13C shows the simulated (solid) and the experimentally measured (dashed) power spectra at the corresponding four (4) detector locations at the output plane.

Figures 14A, 14B:
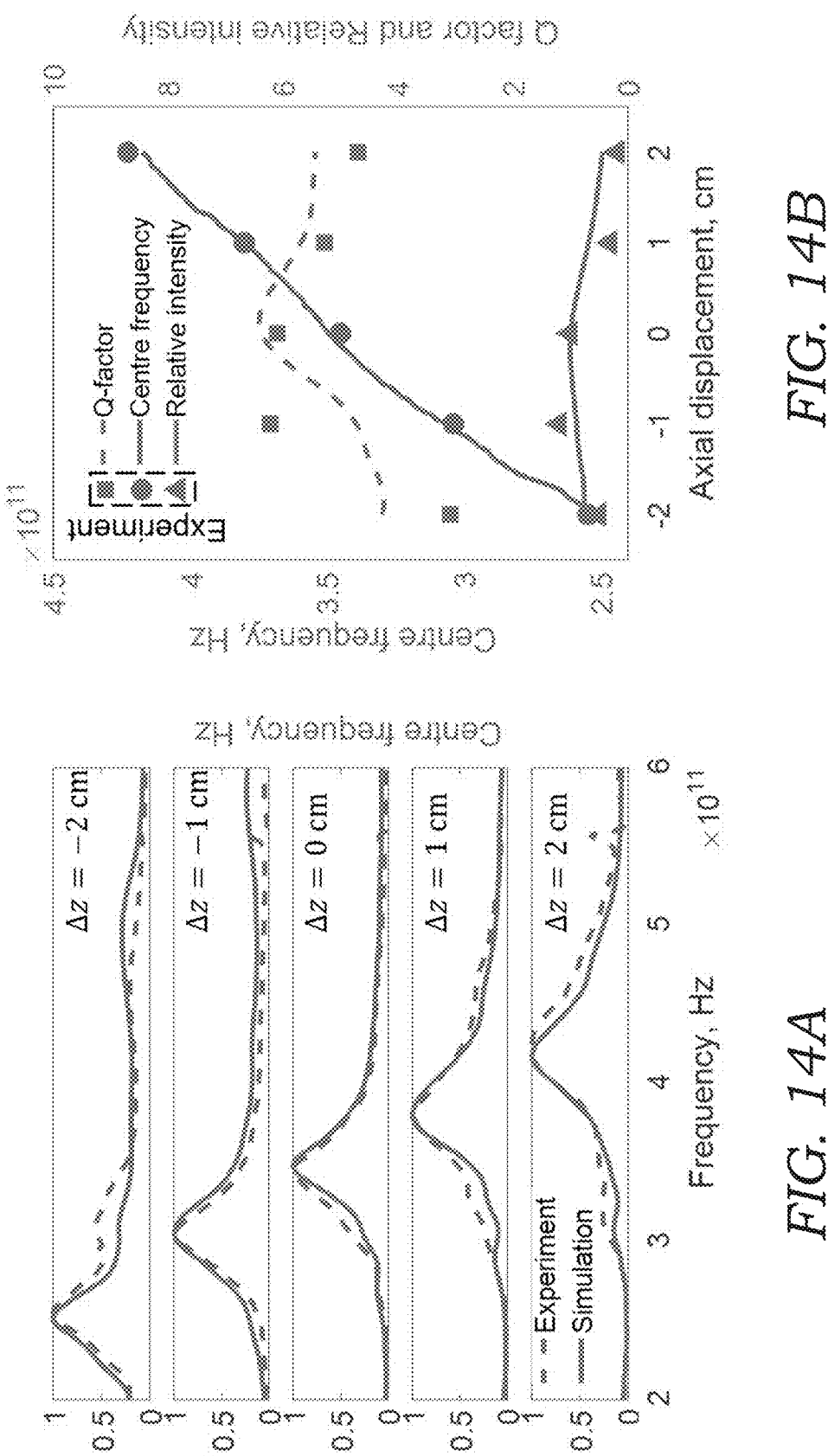
Figures 14C, 14D:
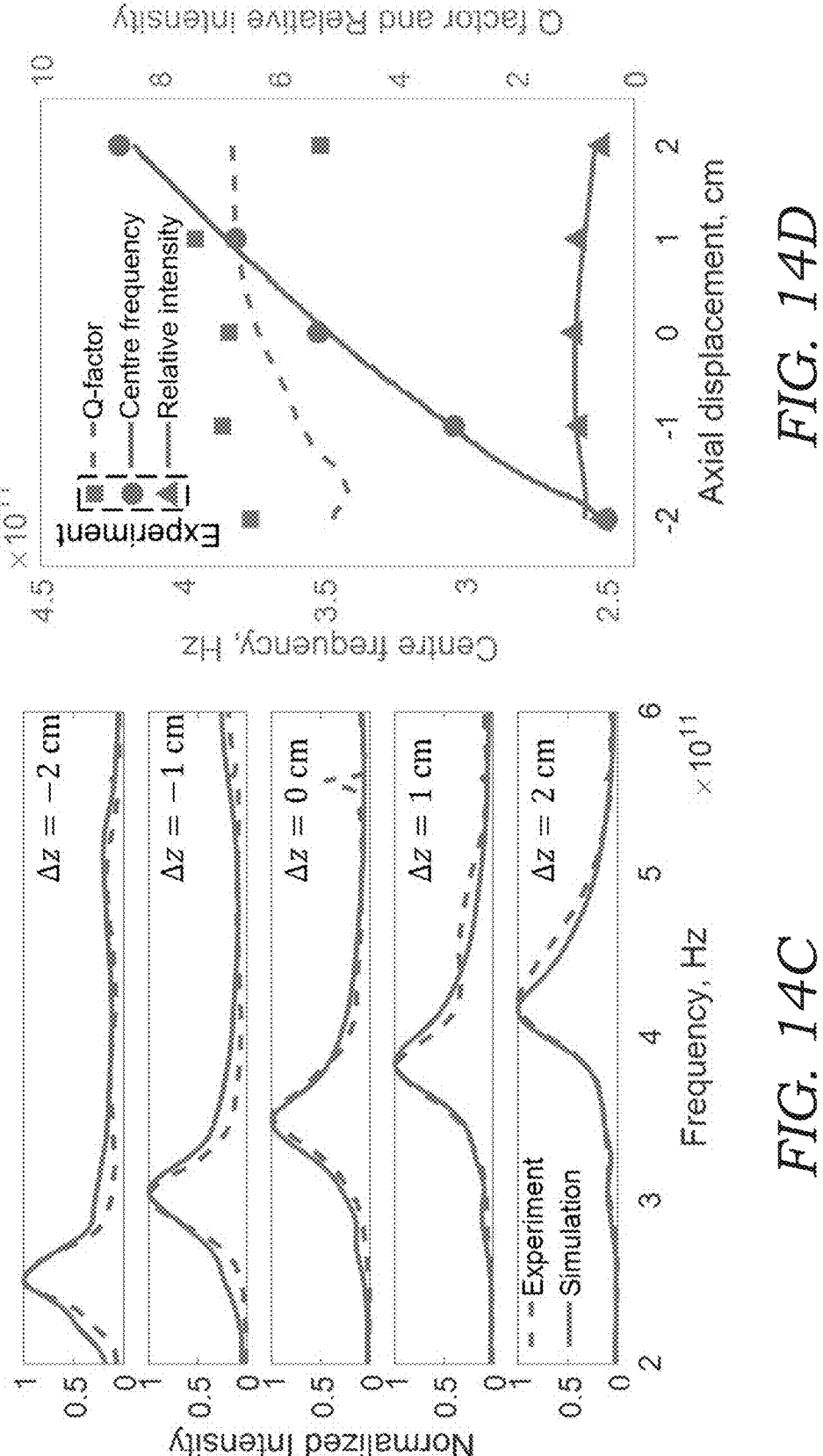

FIGS. 14A-14D: Illustrates the tunability of broadband optical neural networks. FIG. 14A shows the experimental (dashed line) and the numerically computed (solid line) output spectra for different axial distances between the last ($3^{rd}$) diffractive layer and the output aperture based on the single passband spectral filter model shown in FIG. 11B. $\Delta z$ denotes the axial displacement of the output aperture with respect to its designed location. Negative values of $\Delta z$ represent locations of the output aperture closer to the diffractive layers and vice versa for the positive values. FIG. 14B shows numerical and experimentally measured changes in the center frequency (circles), the Q-factor (dashed line and squares) and the relative intensity (solid line and triangles) with respect to $\Delta z$. FIGS. 14C and 14D are the same as in FIGS. 14A, 14B, respectively, except corresponding to a new design that is initialized using the diffractive spectral filter model of FIG. 11B, which was further trained with multiple loss terms associated with the corresponding passbands at different propagation distances from the last diffractive layer. Similar to transfer learning techniques used in deep learning, this procedure generates a new design that is specifically engineered for a tunable frequency response with enhanced and a relatively flat Q-factor across the targeted displacement range, $\Delta z$. The small residual peaks at around ~0.55 THz observed in the experimental results are due to the water absorption lines in air, which were not taken into account in the numerical forward model.

FIGS. 15A-15B are the dispersion curves of the polymer material (VeroBlackPlus RGD875) used for 3D-printing of the diffractive optical neural networks. Complex valued refractive index of a 1 mm-thick 3D printed layer that is made of VeroBlackPlus RGD875 was analyzed by the THz-TDS system described in the Methods section herein. The refractive index (FIG. 15A) and the extinction coefficient (FIG. 15B) of VeroBlackPlus RGD875 material was calculated based on the real and imaginary parts of the complex refractive index, respectively.

FIG. 16 shows the broadband diffractive optical network-based spectral filter design using different sizes of output apertures (Apt.). Using three (3) diffractive layers with a layer-to-layer separation of 3 cm, and an output aperture that is 5 cm away from the $3^{rd}$ diffractive layer, different single passband spectral filters were designed around the center frequency of 350 GHz by changing the size of the output aperture (1, 2, 5 and 10 mm). Training phase involved a target Q-factor of 10 and $$\frac{\alpha}{\beta} = 1.$$

The degrees of freedom in the diffractive network permit one to maintain the Q-factor for various aperture sizes. Relatively lower power efficiency in the case of the 1 mm aperture is due to the fact that the aperture size in that case is comparable to the center wavelength (~0.85 mm).

Figure 17A:
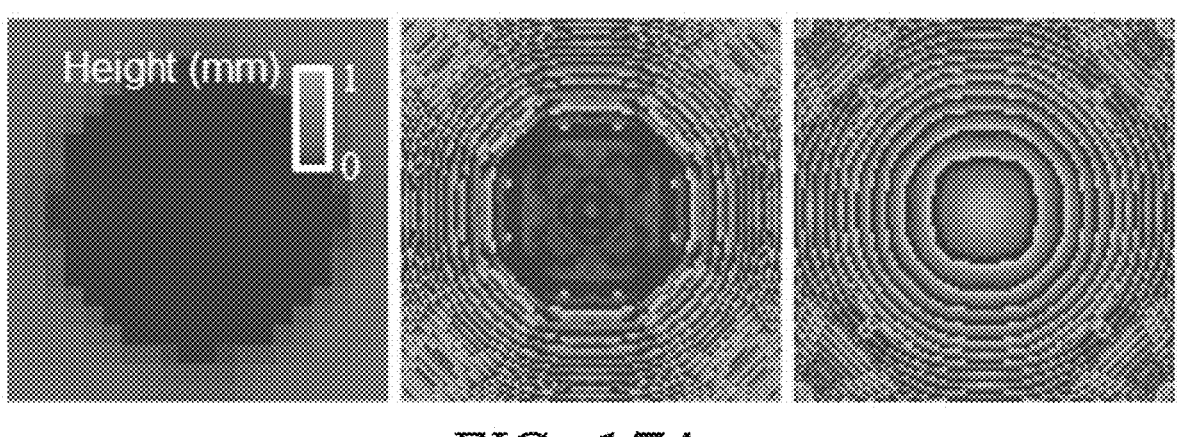
Figure 17B:
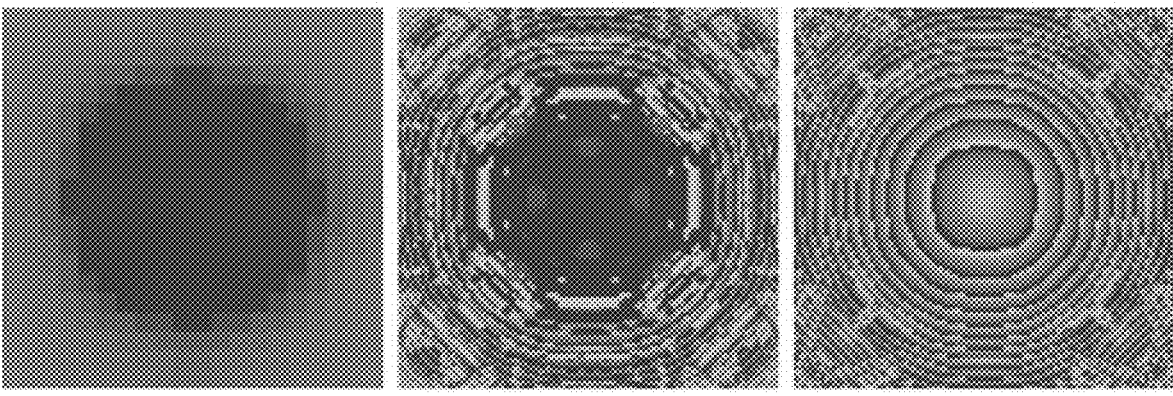
Figure 17C:
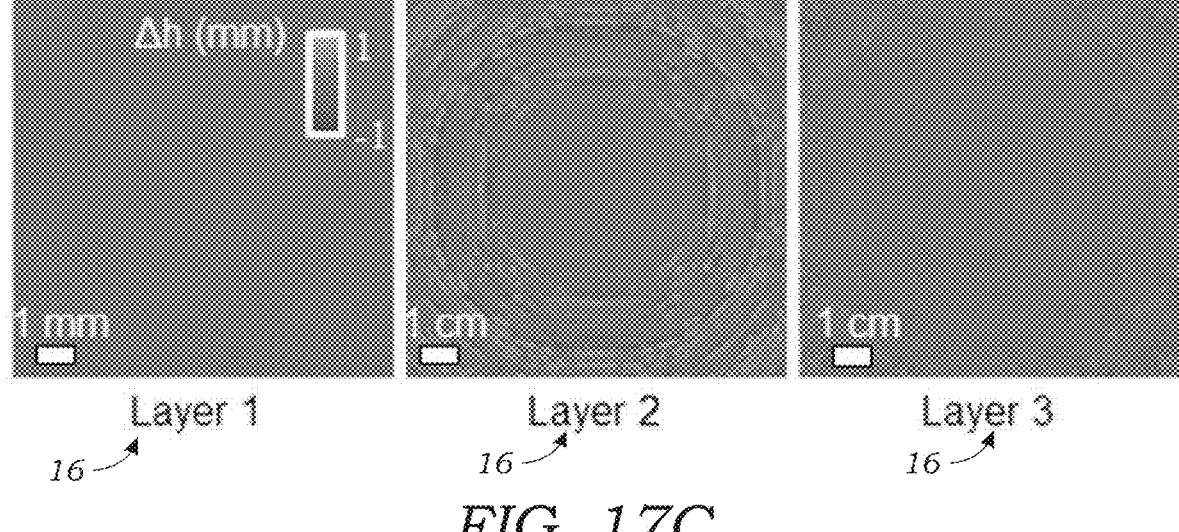

FIGS. 17A-17C illustrates the thickness distributions of the diffractive layers (substrate layers) of the two single passband filter designs, before and after transfer learning. FIG. 17A shows the thickness profile of the diffractive layers before transfer learning; also shown in FIG. 11B. FIG. 17B shows the thickness profile of the diffractive layers after transfer learning. FIG. 17C illustrates the differences in the thickness distributions of the diffractive layers of the two designs, before and after transfer learning. With the additional constraints and training, subtle changes to the thickness distributions of the diffractive layers were applied to improve the tunability of the diffractive bandpass filter. The positive (negative) values in (FIG. 17C) denote a thickness reduction (increase) after the transfer learning step, which generated a new design that is specifically engineered for a tunable frequency response with enhanced and a more uniform Q-factor across the targeted axial displacement range (see FIGS. 14A-14D).

DETAILED DESCRIPTION OF THE ILLUSTRATED EMBODIMENTS

Figures 1, 2:
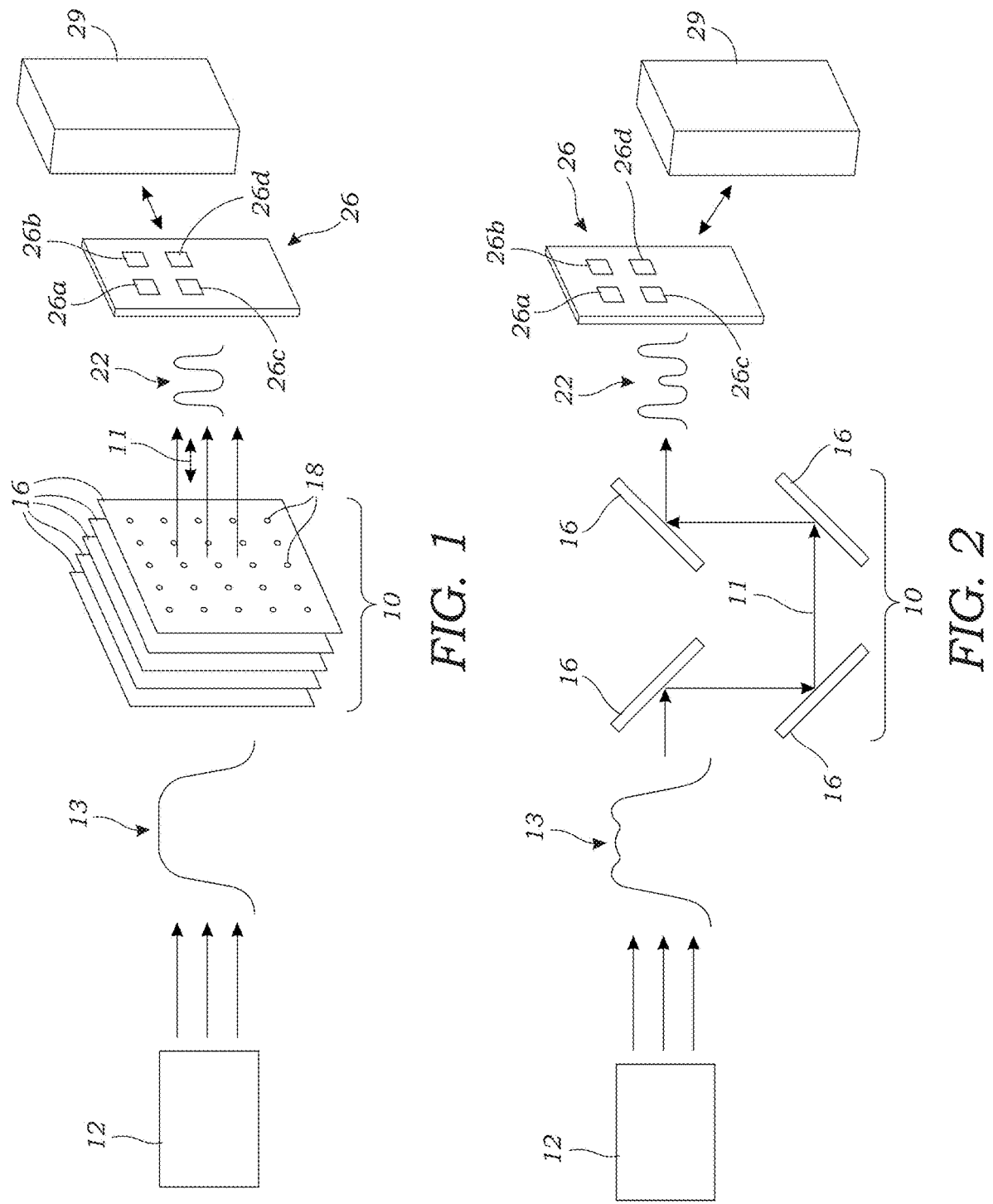
FIG. 1 schematically illustrates one embodiment of an optical neural network that is used in transmission mode according to one embodiment. A broadband source of light directs light through the optical neural network. In this mode, light passes through the individual substrate layers that form the optical neural network. The light that passes through the optical neural network forms one or more output signals that is/are detected by one or more optical sensors.
FIG. 2 schematically illustrates another embodiment of an optical neural network that is used in reflection mode according to one embodiment. A broadband source of light directs light onto an optical neural network that is setup in reflection mode. In this mode, light reflects off the individual substrate layers that form the optical neural network. The reflected light from the optical neural network forms one or more output signals that is/are detected by one or more optical sensors.

FIG. 1 schematically illustrates one embodiment of an optical neural network device 10 that is used in transmission mode according to one embodiment. A broadband light source 12 directs broadband light or a broadband optical signal 13 into the optical neural network device 10 that contains a plurality of substrate layers 16 (also sometimes referred to herein as diffractive layers). The broadband light source 12 may include in some embodiments a pulsed light source 12. In other embodiments, the broadband light source 12 may include a continuous light source 12. In the experiments described herein, the broadband light source is a THz emitter driven by a laser that produces a THz pulse. As explained herein, in some embodiments, an input aperture 14 may be interposed between the broadband light source 12 and the first substrate layer 16 (e.g., diffractive layer) of the optical neural network device 10. The aperture 14 may also be formed in the light source 12 or in a waveguide or the like coupled to the light source 14 (e.g., end of optical fiber forms effective aperture 14).

The optical neural network 10 contains a plurality of substrate layers 16 that are physical layers which may be formed as a physical substrate or matrix of optically transmissive material (for transmission mode) or optically reflective material (for reflective mode one or more materials in the optical neural network 10 form a reflective surface). Exemplary materials that may be used for the substrate layers 16 include polymers and plastics (e.g., those used in additive manufacturing techniques such as 3D printing) as well as semiconductor-based materials (e.g., silicon and oxides thereof, gallium arsenide and oxides thereof), crystalline materials or amorphous materials such as glass and combinations of the same. While FIG. 1 illustrates light emitting directly from a broadband light source 12 going directly into the optical neural network 10, the light from the broadband light source 12 pass through and/or reflect off an object, medium, or the like prior entering the optical neural network 10. The broadband light source of light 12 may generate a broadband optical signal 13 that is formed from a plurality of different wavelengths that collectively form a broadband optical signal. The broadband optical signal 13 that is input to the optical neural network 10 may span a variety of wavelengths or frequency ranges. This includes, for example, a broadband optical signal 13 that is within the visible electromagnetic spectrum (e.g., around 380 nm to around 750 nm wavelengths) from a visible source of light 12. The broadband optical signal 13 may be in the THz frequency range as is disclosed herein. The broadband optical signal 13 may also be in the infrared region of the electromagnetic spectrum (e.g., generally above 750 nm wavelengths to millimeter, centimeter, or larger wavelengths).

With reference to FIGS. 4-6, each substrate layer 16 of the optical neural network has a plurality of physical features 18 formed on the surface of the substrate layer 16 or within the substrate layer 16 itself that collectively define a pattern of physical locations along the length and width of each substrate layer 16 that have varied complex-valued transmission coefficients (or varied complex-valued transmission reflection coefficients for the embodiment of FIG. 2). The physical features 18 formed on or in the layers 16 thus create a pattern of physical locations within the layers 16 that have different complex-valued transmission coefficients as a function of lateral coordinates (e.g., length and width and in some embodiments depth) across each substrate layer 16. In some embodiments, each separate physical feature 18 may define a discrete physical location on the substrate layer 16 while in other embodiments, multiple physical features 18 may combine or collectively define a physical region with a particular complex-valued transmission coefficient. The plurality of optically transmissive layers 16 arranged along the optical path 11 (FIG. 1) collectively define a trained mapping function between a broadband optical signal 13 input to the plurality layers 16 and one or more output optical signal(s) 22 created by optical diffraction through/off the plurality of substrate layers 16.

The pattern of physical locations formed by the physical features 18 may define, in some embodiments, an array located across the surface of the substrate layer 16. With reference to FIG. 3, the substrate layer 16 in one embodiment is a two-dimensional generally planer substrate having a length (L), width (W), and thickness (t) that all may vary depending on the particular application. In other embodiments, the substrate layer 16 may be non-planer such as, for example, curved. In addition, while FIG. 3 illustrates a rectangular or square-shaped substrate layer 16 different geometries are contemplated. With reference to FIG. 1 and FIG. 3, the physical features 18 and the physical regions formed thereby act as artificial "neurons" 24 as seen in FIG. 3 that connect to other "neurons" 24 of other substrate layers 16 of the optical neural network 10 (as seen, for example, in FIGS. 1 and 2) through optical diffraction (or reflection in the case of the embodiment of FIG. 2) and alter the phase and/or amplitude of the light wave. The particular number and density of the physical features 18 or artificial neurons 24 that are formed in each substrate layer 16 may vary depending on the type of application. In some embodiments, the total number of artificial neurons 24 may only need to be in the hundreds or thousands while in other embodiments, hundreds of thousands or millions of neurons 24 or more may be used. Likewise, the number of layers 16 that are used in a particular optical neural network 10 may vary although it typically ranges from at least two substrate layers 16 to less than ten substrate layers 16.

As seen in FIG. 1, the one or more output optical signal(s) 22 is/are captured by one or more optical sensors 26. The optical sensor 26 may include, for example, an image sensor (e.g., CMOS image sensor or image chip such as CCD), photodetectors (e.g., photodiode such as avalanche photodiode detector (APD)), photomultiplier (PMT) device, and the like. With reference to FIGS. 1 and 2, there are multiple optical sensors 26a, 26b, 26c, 26d. These may be discrete optical sensors or they may even be certain pixels on a larger array such as CMOS image sensor that act as individual sensors. The one or more optical sensors 26 may, in some embodiments, be coupled to a computing device 29 as seen in FIG. 1 (e.g., a computer or the like such as a personal computer, laptop, server, mobile computing device) that is used to acquire, store, process, manipulate, analyze, and/or transfer the one or more output optical signal(s) 22. In other embodiments, the optical sensor 26 may be integrated within a device such as a camera that is configured to acquire, store, process, manipulate, analyze, and/or transfer the one or more output optical signal(s) 22. As described herein, in some embodiments, each sensor 26 may be associated with an output aperture 34. An opaque layer having one or more apertures 34 formed therein may be interposed between the last of the substrate layers 16 and the sensor(s) 26.

FIG. 2 schematically illustrates one embodiment of an optical neural network 10 that is used in reflection mode according to one embodiment. Similar components and features shared with the embodiment of FIG. 1 are labeled similarly. In this embodiment, the object is illuminated with broadband light from the broadband light source 12 as described previously. This broadband optical signal 13 forms an input optical signal that is input to the optical neural network 10. In this embodiment, the optical neural network 10 operates in reflection mode whereby light is reflected by a plurality of substrate layers 16. As seen in the embodiment of FIG. 2, the optical path 11 is a folded optical path as a result of the reflections off the plurality of substrate layers 16. The number of substrate layers 16 may vary depending on the particular function or task that is to be performed as noted above. Each substrate layer 16 of the optical neural network 10 has a plurality of physical features 18 formed on the surface of the substrate layer 16 or within the substrate layer 16 itself that collectively define a pattern of physical locations along the length and width of each substrate layer 16 that have varied complex-valued reflection coefficients. Like the FIG. 1 embodiment, the one or more output optical signal(s) 22 is captured by one or more optical sensors 26. The one or more optical sensors 26 may be coupled to a computing device 29 as noted or integrated into a device such as a camera.

FIG. 4 illustrates one embodiment of how different physical features 18 are formed in the substrate layer 16. In this embodiment, a substrate 16 has different thicknesses (t) of material at different lateral locations along the substrate layer 16. In one embodiment, the different thicknesses (t) modulates the phase of the light passing through the substrate layer 16. This type of physical feature 18 may be used, for instance, in the transmission mode embodiment of FIG. 1. The different thicknesses of material in the substrate layer 16 forms a plurality of discrete "peaks" and "valleys" that control the complex-valued transmission coefficient of the neurons 24 formed in the substrate layer 16. The different thicknesses of the substrate layer 16 may be formed using additive manufacturing techniques (e.g., 3D printing) or lithographic methods utilized in semiconductor processing. For example, the design of the substrate layers 16 may be stored in a stereolithographic file format (e.g., .stl file format) which is then used to 3D print the substrate layers 16. Other manufacturing techniques include well-known wet and dry etching processes that can form very small lithographic features on a substrate layer 16. Lithographic methods may be used to form very small and dense physical features 18 on the substrate layer 16 which may be used with shorter wavelengths of the light. As seen in FIG. 4, in this embodiment, the physical features 18 are fixed in permanent state (i.e., the surface profile is established and remains the same once complete).

FIG. 5 illustrates another embodiment in which the physical features 18 are created or formed within the substrate layer 16. In this embodiment, the substrate layer 16 may have a substantially uniform thickness but have different regions of the substrate 16 have different optical properties. For example, the complex-valued refractive (or reflective) index of the substrate layers 16 may altered by doping the substrate layers 16 with a dopant (e.g., ions or the like) to form the regions of neurons 24 in the substrate layers 16 with controlled transmission properties. In still other embodiments, optical nonlinearity can be incorporated into the deep optical network design using various optical nonlinear materials (crystals, polymers, semiconductor materials, doped glasses, polymers, organic materials, semiconductors, graphene, quantum dots, carbon nanotubes, and the like) that are incorporated into the substrate layer 16. A masking layer or coating that partially transmits or partially blocks light in different lateral locations on the substrate layer 16 may also be used to form the neurons 24 on the substrate layers 16.

Alternatively, the complex-valued transmission function of a neuron 24 can also engineered by using metamaterial or plasmonic structures. Combinations of all these techniques may also be used. In other embodiments, non-passive components may be incorporated in into the substrate layers 16 such as spatial light modulators (SLMs). SLMs are devices that imposes spatial varying modulation of the phase, amplitude, or polarization of a light. SLMs may include optically addressed SLMs and electrically addressed SLM. Electric SLMs include liquid crystal-based technologies that are switched by using thin-film transistors (for transmission applications) or silicon backplanes (for reflective applications). Another example of an electric SLM includes magneto-optic devices that use pixelated crystals of aluminum garnet switched by an array of magnetic coils using the magneto-optical effect. Additional electronic SLMs include devices that use nanofabricated deformable or moveable mirrors that are electrostatically controlled to selectively deflect light.

FIG. 6 schematically illustrates a cross-sectional view of a single substrate layer 16 of an optical neural network 10 according to another embodiment. In this embodiment, the substrate layer 16 is reconfigurable in that the optical properties of the various physical features 18 that form the artificial neurons 24 may be changed, for example, by application of a stimulus (e.g., electrical current or field). An example includes spatial light modulators (SLMs) discussed above which can change their optical properties. In other embodiments, the layers may use the DC electro-optic effect to introduce optical nonlinearity into the substrate layers 16 of an optical neural network 10 and require a DC electric-field for each substrate layer 16 of the optical neural network 10. This electric-field (or electric current) can be externally applied to each substrate layer 16 of the optical neural network 10. Alternatively, one can also use poled materials with very strong built-in electric fields as part of the material (e.g., poled crystals or glasses). In this embodiment, the neuronal structure is not fixed and can be dynamically changed or tuned as appropriate (i.e., changed on demand). This embodiment, for example, can provide a learning optical neural network 10 or a changeable optical neural network 10 that can be altered on-the-fly to improve the performance, compensate for aberrations, or even change another task.

The optical neural network 10 described herein may perform a number of functions or operations on the input broadband optical signal 13. For example, in one embodiment, the optical neural network 10 filters a particular wavelength or a set of wavelengths within a wavelength range of the broadband optical signal 13 that is input to the optical neural network 10 (e.g., within the range of the broadband light source 12). In another embodiment, the optical neural network 10 filters a plurality of particular wavelengths or sets of wavelengths within a wavelength range of the input broadband optical signal 13. The optical neural network 10 may also be used to generate wavelength de-multiplexed output optical signal(s) 22 for the one or more optical sensors 26. The optical neural network 10 may also generate a single common multiplexed output optical signal 22 or channel for the one or more optical sensors 26 (in this case one optical sensor 26) from individually filtered or de-multiplexed channels that are used as the broadband optical signal 13 that is input to the optical neural network 10. In this last embodiment, the optical neural network 10 works in the "reverse" that takes multiple input "channels" as part of the broadband optical signal 13 and outputs a single common multiplexed output optical signal 22 or channel.

FIG. 7 illustrates a flowchart of the operations or processes according to one embodiment to create and use an optical neural network 10. As seen in operation 200 of FIG. 7, a specific task/function is first identified that the optical neural network 10 will perform. This may include, for example, filtering a broadband optical signal 13 as explained herein. The filter may, for example, pass one or more bands of a particular wavelength or wavelength range. The specific task/function may also include wavelength de-multiplexing of the input broadband optical signal 13. Once the task or function has been established, a computing device 100 having one or more processors 102 executes software 104 thereon to then digitally train a model or mathematical representation of multi-layer diffractive and/or reflective substrate layers 16 formed in the optical neural network 10 to the desired task or function to then generate a design for a physical embodiment of the optical neural network 10. This operation is illustrated as operation 210 in 220.

Next, using the design for the physical embodiment of the optical neural network 10, the actual substrate layers 16 used in the physical optical neural network 10 are then manufactured in accordance with the design. The design, in some embodiments, may be embodied in a software format (e.g., SolidWorks, AutoCAD, Inventor, or other computer-aided design (CAD) program or lithographic software program) and may then be manufactured into a physical embodiment that includes the plurality of substrate layers 16. The physical substrate layers 16, once manufactured may be mounted or disposed in a holder 30 such as that illustrated in FIG. 8. The holder 30 may include a number of slots 32 formed therein to hold the individual substrate layers 16 in the required sequence and with the required spacing between adjacent layers (if needed). Once the physical embodiment of the optical neural network 10 has been made, the optical neural network 10 is then used to perform the specific task or function as illustrated in operation 230 of FIG. 7.

Note that in some embodiments, an aperture 34 such as that illustrated in FIGS. 10A, 10B, 10C may be interposed between the last of the physical substrate layers 16 and the optical sensor 26. While a THz optical sensor 26 is disclosed herein, it should be appreciated that a variety of different optical sensors 26 could be employed. These include, a CMOS image sensor or image chip such as CCD, photodetectors (e.g., photodiode such as avalanche photodiode detector (APD)), photomultiplier (PMT) device, focal plane array, and the like. There may be a single optical sensor 26 or an array of such sensors 26. Likewise, the broadband light source or input optical signal may comprise other frequencies of the electromagnetic spectrum. This includes, for example, light from a broadband visible source or a broadband infrared source.

As noted above, the particular spacing of the substrates 16 that make the optical neural network 10 may be maintained using the holder 30 of FIG. 8. The holder 30 may contact one or more peripheral surfaces of the substrate layers 16. In some embodiments, the holder 30 may contain a number of slots 32 that provide the ability of the user to adjust the spacing (S) between adjacent substrate layers 16. In some embodiments, the substrate layers 16 may be permanently secured to the holder 30 while in other embodiments, the substrate layers 16 may be removable from the holder 30. The plurality of substrate layers 16 may be positioned within and/or surrounded by vacuum, air, a gas, a liquid, or a solid material.

Experimental

Design of Broadband Diffractive Optical Networks

Designing broadband, task-specific and small footprint, compact components that can perform arbitrary optical transformations is highly sought in all parts of the electromagnetic spectrum for various applications, including e.g., tele-communications, biomedical imaging and chemical identification, among others. This general broadband inverse optical design problem was approached from the perspective of diffractive optical neural network training and its success was demonstrated with various optical tasks. Unlike the training process of the previously reported monochromatic diffractive neural networks, here the optical forward model used to design the optical neural network 10 is based on the angular spectrum formulation of broadband light propagation within the diffractive network, precisely taking into account the dispersion of the fabrication material to determine the light distribution at the output plane of the network. Based on a network training loss function, a desired optical task can be learned through error backpropagation within the diffractive layers 16 of the optical network, converging to an optimized spectral and/or spatial distribution of light at the output plane.

In its general form, the broadband diffractive network design assumes an input spectral frequency band between $f_{min}$ and $f_{max}$. Uniformly covering this range, M discrete frequencies are selected to be used in the training phase. In each update step of the training, an input beam carrying a random subset of B frequencies out of these M discrete frequencies is propagated through the diffractive layers (the layers that ultimately form the substrate layers 16) and a loss function is calculated at the output plane tailored according to the desired task; without loss of generality B/M has been selected in the designs to be less than 0.5%. At the final step of each iteration, the resultant error is backpropagated to update the physical parameters of the diffractive layers (e.g., during the computational training operation 210 in FIG. 7) controlling the optical modulation within the optical network. The training cycle 210 continues until either a predetermined design criterion at the network output plane is satisfied or the maximum number of epochs (where each epoch involves $$\left\lfloor \frac{M}{B} \right\rfloor$$

successive iterations) is reached. In the broadband diffractive network designs 10, the physical parameter to be optimized was selected as the thickness of each neuron 24 (i.e., thickness of physical features 18) within the substrate layers 16, enabling the control of the phase modulation profile of each diffractive layer 16 in the network. In addition, the material dispersion including the real and imaginary parts of the refractive index of the network material as a function of the wavelength were also taken into account to correctly represent the forward model of the broadband light propagation within the optical neural network 10. As a result of this, for each wavelength within the input light spectrum, there is a unique complex (i.e., phase and amplitude) modulation, corresponding to the transmission coefficient of each neuron 24, determined by its physical thickness, which is a trainable parameter for all the layers 16 of the diffractive optical network.

Upon completion of the digital training phase in a computer 29, which typically takes ~5 hours, the designed diffractive layers 16 were then physically fabricated using a 3D-printer and the resulting optical neural networks 10 were experimentally tested using the THz Time-Domain Spectroscopy (TDS) system illustrated in FIGS. 9A-9D, which has a noise-equivalent power bandwidth of 0.1-5 THz.

Single Passband Spectral Filter Design and Testing

The diffractive single passband spectral filter designs are comprised of three (3) diffractive layers 16, with a layer-to-layer separation of 3 cm, and an output aperture 34, positioned 5 cm away from the last diffractive layer 16, serving as a spatial filter as shown in FIGS. 9A-9D. For the spectral filter designs, the parameters M, $f_{min}$ and $f_{max}$ were taken as 7500, 0.25 THz and 1 THz, respectively. Using this broadband diffractive network framework employing three (3) successive layers 16, four (4) different optical neural networks 10 that operated as spectral bandpass filters were designed with center frequencies of 300 GHz, 350 GHz, 400 GHz and 420 GHz, as shown in FIGS. 11A-11D, respectively. For each design, the target spectral profile was set to have a flat-top bandpass over a narrow band (±2.5 GHz) around the corresponding center frequency. During the training of these designs, a loss function was used that solely focused on increasing the power efficiency of the target band, without a specific penalty on the Q-factor of the filter. As a result of this design choice during the training phase, the numerical models converged to bandpass filters centered around each target frequency as shown in FIGS. 11A-11D. These trained diffractive models reveal the peak frequencies (and the Q-factors) of the corresponding designs to be 300.1 GHz (6.21), 350.4 GHz (5.34), 399.7 GHz (4.98) and 420.0 GHz (4.56), respectively. After the fabrication of each one of these trained models to form the physical optical neural network 10 using a 3D-printer, these four different diffractive networks were experimentally tested to find out a very good match between the numerical testing results and the physical diffractive network 10 results: based on the dashed lines depicted in FIGS. 11A-11D, the experimental counterparts of the peak frequencies (and the Q-factors) of the corresponding designs were calculated as 300.4 GHz (4.88), 351.8 GHz (7.61), 393.8 GHz (4.77) and 418.6 GHz (4.22).

Furthermore, the power efficiencies of these four different bandpass filter designs, calculated at the corresponding peak wavelength, were determined as 23.13%, 20.93%, 21.76% and 18.53%, respectively. To shed more light on these efficiency values of the diffractive THz systems and estimate the specific contribution due to the material absorption, the expected power efficiency at 350 GHz was analyzed by modeling each diffractive layer 16 as a uniform slab. Based on the extinction coefficient of the 3D-printing polymer at 350 GHz (FIGS. 15A, 15B), three (3) successive flat layers, each with 1 mm thickness, provide 27.52% power efficiency when the material absorption is assumed to be the only source of loss. This comparison reveals that the main source of power loss in the spectral filter models is in fact the material absorption, which can be circumvented by selecting different types of fabrication materials with lower absorption compared to the 3D printer material actually used in the experiments (i.e., acrylic compound, VeroBlackPlus RGD875).

To further exemplify the different degrees of freedom in the diffractive network-based design framework, FIG. 11E illustrates another optical neural network 10 that was designed as a bandpass filter that is centered at 350 GHz, same as in FIG. 11B; however, different than FIG. 11B this particular case represents a design criterion where the desired spectral filter profile was set as a Gaussian with a Q-factor of 10. Furthermore, the training loss function was designed to favor a high Q-factor rather than better power efficiency by penalizing Q-factor deviations from the target value more severely compared to poor power efficiency. To provide a fair comparison between FIGS. 11B and 11E, all the other design parameters, e.g., the number of diffractive layers 16, the size of the output aperture 34 and the relative distances are kept identical. Based on this new design (FIG. 11E), the numerical (experimental) values of the peak frequency and the Q-factor of the final model can be calculated as 348.2 GHz (352.9 GHz) and 10.68 (12.7), once again providing a very good match between the numerical testing and experimental results (solid and dashed lines), following the 3D printing of the optical neural network 10. Compared to the results reported in FIG. 11B, this improvement in the Q-factor also comes at the expense of a power efficiency drop down to 12.76%, which is expected by design, i.e., the choice of the training loss function.

Another important difference between the designs depicted in FIGS. 11B and 11E lies in the structures of their diffractive layers 16. A comparison of the $3^{rd}$ layers shown in FIGS. 11B and 11E reveals that, while the former design demonstrates a pattern at its $3^{rd}$ layer that is intuitively similar to a diffractive lens, the thickness profile of the latter design (FIG. 11E) does not evoke any physically intuitive explanation of its immediate function within the diffractive network 10; the same conclusion is also evident if one examines the $1^{st}$ diffractive layers reported in FIG. 11E as well as FIGS. 12A-12C and 13A-13C. Convergence to physically non-intuitive designs such as illustrated herein, in the absence of a tailored initial condition or prior design, shows the power of the diffractive computational framework in the context of broadband, task-specific optical system design.

Dual Passband Spectral Filter Design and Testing

Having presented the design and experimental validation of five (5) different bandpass filters using broadband optical neural networks 10, the same design framework was used for a more challenging task: a dual passband spectral filter that directs two separate frequency bands onto the same output aperture 34 while rejecting the remaining spectral content of the broadband input light. The physical layout of the diffractive network 10 design is the same as before, composed of three (3) diffractive layers 16 and an output aperture 34 plane. The goal of this diffractive optical network 10 is to produce a power spectrum at the same aperture 34 that is the superposition of two flat-top passband filters, around the center frequencies of 250 GHz and 450 GHz (see FIGS. 11A-11C). Following the deep learning-based design and 3D fabrication of the optical neural network 10, the experimental measurement results (dashed line in FIG. 11A) provide a very good agreement with the numerical results (solid line in FIG. 11A); the numerical diffractive model has peak frequencies at 249.4 GHz and 446.4 GHz, which closely agree with the experimentally observed peak frequencies, i.e., 253.6 GHz and 443.8 GHz for the two target bands.

Despite the fact that no restrictions or loss terms related to the Q-factor were imposed during the training phase, the power efficiencies of the two center/peak frequencies, 250 GHz and 450 GHz, were calculated as 11.91% and 10.51%, respectively. These numbers indicate a power efficiency drop compared to the single passband diffractive designs reported earlier (FIGS. 11A-11E); however, it should be noted that the total power transmitted from the input plane to the output aperture 34 (which has the same size as before) is maintained at approximately 20% in both the single passband and the double passband filter designs.

A projection of the intensity distributions produced by the 3-layer design on the xz plane (at y=0) is also illustrated in FIG. 11B, which exemplifies the operation principles of the diffractive network regarding the rejection of the spectral components residing between the two targeted passbands. For example, one of the undesired frequency components at 350 GHz, is focused to a location between the $3^{rd}$ layer 16 and the output aperture 34 with a higher numerical aperture (NA) compared to the waves in the target bands. As a result, this frequency quickly diverges as it propagates until the output plane, hence its contribution to the transmitted power beyond the aperture is significantly decreased, as desired.

From the spectrum reported in FIG. 11A, it can also be noticed that there is a difference between the Q-factors of the two passbands. The main factor causing this variation in the Q-factor is the increasing material loss at higher frequencies (FIGS. 15A and 15B), which is a limitation due to the 3D printing material that was used. If one selects the power efficiency as the main design priority in a broadband diffractive network, the optimization of a larger Q-factor optical filter function is relatively more cumbersome for higher frequencies due to the higher material absorption that are experienced in the physically fabricated, 3D-printed optical neural network 10. As a general rule, maintaining both the power efficiencies and the Q-factors over K bands in a multi-band filter design requires optimizing the relative contributions of the training loss function sub-terms associated with each design criterion; this balance among the sub-constituents of the loss function should be carefully engineered during the training phase of a broadband diffractive network depending on the specific task of interest.

Spatially-Controlled Wavelength De-Multiplexing

Next, the simultaneous control of the spatial and spectral content of the diffracted light at the output plane of a broadband diffractive optical network was investigated, and demonstrated its utility for spatially-controlled wavelength de-multiplexing, by training three (3) diffractive layers 16 (FIG. 13B) that channel the broadband input light onto four (4) separate output apertures 34 on the same plane, corresponding to four (4) passbands around 300 GHz, 350 GHz, 400 GHz and 450 GHz (FIG. 13A). The numerically designed spectral profiles based on the diffractive optical network model (solid) and its experimental validation (dashed), following the 3D-printing of the trained model, are reported in FIG. 13C for each sub-band, providing once again a very good match between the numerical model and the experimental results. Based on FIG. 13C, the numerically estimated and experimentally measured peak frequency locations are (297.5 GHz, 348.0 GHz, 398.5 GHz, 450.0 GHz) and (303.5 GHz, 350.1 GHz, 405.1 GHz, 454.8 GHz), respectively. The corresponding Q-factors calculated based on the simulations (11.90, 10.88, 9.84, 8.04) are also in accordance with their experimental counterparts (11.0, 12.7, 9.19, 8.68), despite various sources of experimental errors. Similar to the earlier observations in dual passband filter results, higher bands exhibit a relatively lower Q-factor that is related to the increased material losses at higher frequencies (FIGS. 15A-15B).

In addition to the material absorption losses, there are two other factors that need to be considered for wavelength multiplexing or de-multiplexing related applications using optical neural networks 10. First, the lateral resolution of the fabrication method that is selected to manufacture a broadband optical neural network 10 might be a limiting factor at higher frequencies; for example, the lateral resolution of the 3D printer dictates a feature size of ~$\lambda$/2 at 300 GHz that restricts the diffraction cone of the propagating waves at higher frequencies. Second, the limited axial resolution of a 3D fabrication method might impose a limitation on the thickness levels of the neurons 24 of a diffractive layer design; for example, using the 3D-printer the associated modulation functions of individual neurons 24 are quantized with a step size of 0.0625 mm, which provides 4 bits (within a range of 1 mm) in terms of the dynamic range, which is sufficient over a wide range of frequencies. With increasing frequencies, however, the same axial step size will limit the resolution of the phase modulation steps available per diffractive layer 16, partially hindering the associated performance and the generalization capability of the diffractive optical network 10. Nevertheless, with dispersion engineering methods (using e.g., metamaterials) and/or higher resolution 3D-fabrication technologies, including e.g., optical lithography or two-photon polymerization-based 3D-printing, multi-layer wavelength multiplexing/de-multiplexing systems operating at various different parts of the electromagnetic spectrum can be designed and tested using broadband optical neural networks 10.

There are several factors which might have contributed to the relatively minor discrepancies observed between the numerical simulations and the experimental results reported. First, any mechanical misalignment (lateral and/or axial) between the diffractive layers 16 due to e.g., the 3D-printer's resolution can cause some deviation from the expected output. In addition, the THz pulse incident on the input plane is assumed to be spatially-uniform, propagating parallel to the optical axis 11, which might introduce additional experimental errors in the results due to imperfect beam profile and alignment with respect to the optical axis 11. Moreover, the wavelength dependent properties of the THz detector 36 such as the acceptance angle and the coupling efficiency are not modeled as part of the forward model, which might also introduce error. Finally, potential inaccuracies in the characterization of the dispersion of the 3D-printing materials used in the experiments could also contribute some error in the measurements compared to the trained model numerical results.

For all the designs presented herein, the width of each output aperture 34 is selected as 2 mm which is approximately 2.35 times the largest wavelength (corresponding to $f_{min}$=0.25 THz) in the input pulses. The reason behind this specific design choice is to mitigate some of the unknown effects of the Si lens attached in front of the THz detector, since the theoretical wave optics model of this lens is not available. Consequently, the last layer before the output aperture 34 in the single passband spectral filter designs intuitively resembles a diffractive lens (see FIGS. 11A-11D). However, unlike a standard diffractive lens, the optical neural network 10 that is composed of multiple-layers can provide a targeted Q-factor even for a large range of output apertures, as illustrated in FIG. 16.

It is interesting to note that the diffractive single passband filter designs reported in FIGS. 11A-11E can be tuned by changing the distance between the diffractive neural network (the substrate layers 16) and the output plane or detector(s) 26, establishing a simple passband tunability method for a given fabricated diffractive network 10. FIGS. 14A-14D reports the simulations and experimental results at five (5) different axial distances using the 350 GHz diffractive network design, where $\Delta z$ denotes the axial displacement around the ideal, designed location of the output plane/detectors 26. As the aperture 34 gets closer to the final diffractive layer 16, the passband experiences a red shift (center frequency decreases) and any change in the opposite direction causes a blue shift (center frequency increases). However, deviations from the ideal position of the output aperture also decrease the resulting Q-factor (see FIG. 14B); this is expected since these distances with different $\Delta z$ values were not considered as part of the optical system design during the network training phase. Interestingly, a given diffractive spectral filter model can be used as the initial condition of a new diffractive network design and be further trained with multiple loss terms around the corresponding frequency bands at different propagation distances from the last diffractive layer 16 to yield a better engineered tunable frequency response that is improved from the original diffractive design. To demonstrate the efficacy of this approach, FIGS. 14C and 14D report the output power spectra of this new model (designed around 350 GHz) and the associated Q-factors, respectively. As desired, the resulting Q-factors are now enhanced and more uniform across the targeted $\Delta z$ range due to the additional training with a band tunability constraint, which can be regarded as the counterpart of transfer learning technique (frequently used in machine learning) within the context of optical system design using diffractive neural network models. FIGS. 17A-17C also reports the differences in the thickness distributions of the diffractive layers 16 of these two designs, i.e., before and after the transfer learning, corresponding to FIGS. 14A, 14B and FIGS. 14C, 14D, respectively.

As disclosed herein, the optical neural network platform can be generalized to broadband sources and process optical waves over a continuous, wide range of frequencies. The design framework is, however, not limited to THz wavelengths and can be applied to other parts of the electromagnetic spectrum, including the visible band (and infrared band), and therefore it represents a vital progress towards expanding the application space of diffractive optical neural networks for scenarios where broadband operation is more attractive and essential.

Methods

Terahertz Time-Domain Spectroscopy System

A Ti:Sapphire laser (Coherent MIRA-HP) is used in mode-locked operation to generate femtosecond optical pulses at 780 nm wavelength. Each optical pulse is split into two beams. One part of the beam illuminates the THz emitter (illumination source 12), a high-power plasmonic photoconductive nano-antenna array. The THz pulse generated by the THz emitter is collimated and guided to a THz detector 26 through an off-axis parabolic mirror, which is another plasmonic nano-antenna array that offers high-sensitivity and broadband operation. The other part of the optical beam passes through an optical delay line and illuminates the THz detector 26. The generated signal as a function of delay line position and incident THz/optical fields is amplified with a current pre-amplifier (Femto DHPCA-100) and detected with a lock-in amplifier (Zurich Instruments MFLI). For each measurement, traces are collected for 5 seconds and 10 pulses are averaged to obtain the time-domain signal. Overall, the system offers signal-to-noise ratio levels over 90 dB and observable bandwidths up to 5 THz. Each time-domain signal is acquired within a time window of 400-ps.

Each model of the optical neural network 10, after its 3D-printing, was positioned in between the emitter 12 and the detector 26, coaxial with the THz beam, as shown in FIG. 9D. With a limited input beam size, the first layer of each diffractive network 10 was designed with a 1 cm×1 cm input aperture 14 (as shown in e.g., FIG. 10B. After their training, all the optical neural networks 10 were fabricated using a commercial 3D-printer (Objet30 Pro, Stratasys Ltd.). In front of the THz detector 26, a 2 mm×2 mm output aperture 34 was printed and aluminum coated (FIG. 10C).

Forward Propagation Model

The broadband diffractive optical neural network 10 framework performs optical computation through diffractive layers 12 connected by free space propagation in air. The diffractive layers 12 are modeled as thin modulation elements, where each pixel on $l^{th}$ layer at a spatial location ($x_i$, $y_i$, $z_i$) provides a wavelength ($\lambda$) dependent modulation, t, $$t^l(x_i, y_i, z_i, \lambda) = a^l(x_i, y_i, z_i, \lambda)\exp\left(j\phi^l(x_i, y_i, z_i, \lambda)\right) \quad (1)$$

where a and $\phi$ denotes the amplitude and phase, respectively.

Between the diffractive layers 12, free space light propagation is calculated following the Rayleigh-Sommerfeld equation. The $i^{th}$ pixel on $l^{th}$ layer 16 at location ($x_i$, $y_i$, $z_i$) can be viewed as the source of a secondary wave $$w_i^l(x, y, z, \lambda),$$

which is given by:

$$w_i^l(x, y, z, \lambda) = \frac{z - z_i}{r^2}\left(\frac{1}{2\pi r} + \frac{1}{j\lambda}\right)\exp\left(\frac{j2\pi r}{\lambda}\right) \quad (2)$$

where $r = \sqrt{(x - x_i)^2 + (y - y_i)^2 + (z - z_i)^2}$

Treating the incident field as the $0^{th}$ layer, then the modulated optical field $u^l$ by $l^{th}$ layer at location ($x_i$, $y_i$, $z_i$) is given by:

$$u^l(x_i, y_i, z_i, \lambda) = t^l(x_i, y_i, z_i, \lambda) \cdot \sum_{k \in I} u^{l-1}(x_k, y_k, z_k, \lambda) \cdot w_k^{l-1}(x_i, y_i, z_i, \lambda), \quad (3)$$

$$l \geq 1$$

where I denotes all pixels on the previous layer.

Digital Implementation

Without loss of generality, an equalized spectrum was used during the training phase, i.e., for each distinct $\lambda$ value, a plane wave with unit intensity and uniform phase profile was assumed. The assumed frequency range of at the input plane was taken as 0.25-1 THz for all the designs and this range was uniformly partitioned into M=7500 discrete frequencies. A square input aperture 14 with a width of 1 cm was chosen to match the beam width of the incident THz pulse. Restricted by the fabrication method, a pixel size of 0.5 mm was used as the smallest printable feature size. To accurately model the wave propagation over a wide range of frequencies based on the Rayleigh-Sommerfeld diffraction integral, the simulation window was oversampled by 4 times with respect to the smallest feature size, i.e., the space was sampled with 0.125 mm steps. Accordingly, each feature of the diffractive layers 12 of a given optical neural network 10 design was represented on a 4×4 grid, all the 16 elements sharing the same physical thickness value. The printed thickness value, h, is the superposition of two parts, $h_m$ and $h_{base}$ as depicted in Equation 4b. $h_m$ denotes the part where the wave modulation takes place and is confined between $h_{min}=0$ and $h_{max}=1$ mm. The second term, $h_{base}=0.5$ mm, is a constant, non-trainable thickness value that ensures robust 3D-printing, helping with the stiffness of the diffractive layers. To achieve the constraint applied to $h_m$, the thickness of each diffractive feature over an associated latent (trainable) variable, $h_p$, was defined using the following analytical form:

$$h_m = (\sin(h_p) + 1) \times \frac{h_{max}}{2} \quad (4a)$$

$$h = q(h_m) + h_{base} \quad (4b)$$

where q(.) denotes a 16-level uniform quantization (0.0625 mm for each level with $h_{max}=1$ mm).

The amplitude and phase components of the $i^{th}$ neuron on layer 1, i.e., $a^l(x_i, y_i, z_i, \lambda)$ and $\phi^l(x_i, y_i, z_i, \lambda)$ in Equation (1), can be defined as a function of the thickness of each neuron, $h_i$, and the incident wavelength as follows:

$$a^l(x_i, y_i, z_i, \lambda) = \exp\left(-\frac{2\pi\kappa(\lambda)h_i}{\lambda}\right) \quad (5)$$

$$\phi^l(x_i, y_i, z_i, \lambda) = (n(\lambda) - n_{air})\frac{2\pi h_i}{\lambda} \quad (6)$$

The wavelength dependent parameters, $n(\lambda)$ and the extinction coefficient $\kappa(\lambda)$, are defined over the real and imaginary parts of the refractive index, $\tilde{n}(\lambda)=n(\lambda)+j\kappa(\lambda)$, characterized by the dispersion analysis performed over a broad range of frequencies (FIGS. 15A, 15B).

Loss Function and Training Related Details

After light propagation through the substrate layers 12 of the optical neural network 10, a 2 mm wide output aperture 34 was used at the output plane, right before the integrated detector lens 26 which is made of Si and has the shape of a hemisphere with a radius of 0.5 cm. In the simulations, the detector was modeled as an achromatic flat Si slab with a refractive index of 3.4 and a thickness of 0.5 cm. After propagating through this Si slab, the light intensity residing within a designated detector active area was integrated and denoted by $I_{out}$. The power efficiency was defined by:

$$\eta = \frac{I_{out}}{I_{in}} \qquad (7)$$

where $I_{in}$ denotes the power of the incident light within the input aperture 14 of the optical neural network 10. For each diffractive network model, the power efficiency was reported for the peak wavelength of a given passband.

Loss term, L, used for single passband filter designs was devised to achieve a balance between the power efficiency and the Q-factor, defined as:

$$L = \alpha L_p + \beta L_Q \qquad (8)$$

where $L_p$ denotes the power loss and $L_Q$ denotes the Q-factor loss term; $\alpha$ and $\beta$ are the relative weighting factors for these two loss terms, which were calculated using the following equations:

$$L_p = \sum_{\omega \in B} rect\left(\frac{\omega - \omega_0}{\Delta\omega_P}\right) \times (I_{in} - I_{out}), \qquad (9a)$$

$$L_Q = \sum_{\omega \in B} \left(1 - rect\left(\frac{\omega - \omega_0}{\Delta\omega_Q}\right)\right) \times I_{out} \qquad (9b)$$

with B, $\omega_0$ and $\Delta\omega_P$ denoting the number of frequencies used in a training batch, the center frequency of the target passband and the associated bandwidth around the center frequency, respectively. rect($\omega$) function is defined as:

$$rect(\omega) = \begin{cases} 1, & |\omega| \le \frac{1}{2} \\ 0, & |\omega| > \frac{1}{2} \end{cases} \qquad (10)$$

Assuming a power spectrum profile with a Gaussian distribution $N(\omega_0, \sigma^2)$ with a Full-Width-Half-Maximum (FWHM) bandwidth of $\Delta\omega$, the standard deviation and the associated $\Delta\omega_Q$ were defined as:

$$\sigma^2 = -\frac{\left(\frac{\omega_0}{\Delta\omega}\right)^2}{8\log(0.5)}, \qquad (11a)$$

$$\Delta\omega_Q = 6\sigma \qquad (11b)$$

And the Q-factor was defined as:

$$Q = \frac{\omega_0}{\Delta\omega} \qquad (12)$$

For the single passband diffractive spectral filter designs reported in FIGS. 11A-11D and the dual passband spectral filter reported in FIGS. 11A-11C, $\Delta\omega_P$ for each band was taken as 5 GHz. For these five (5) diffractive designs, $\beta$ in Equation (8) was set to be 0, to enforce the network model to maximize the power efficiency without any restriction or penalty on the Q-factor. For the diffractive spectral filter design illustrated in FIG. 11E, on the other hand, $$\frac{\alpha}{\beta}$$

ratio (balancing the power efficiency and Q-factor) was set to be 0.1 in Equation (8).

In the design phase of the spatially-controlled wavelength de-multiplexing system (FIGS. 13A-13C), following the strategy used in the filter design depicted in FIG. 11E, the target spectral profile around each center frequency was taken as a Gaussian with a Q-factor of 10. For simplicity, the $\alpha/\beta$ ratio in Equation (8) was set to be 0.1 for each band and detector location, i.e., $$\frac{\alpha_1}{\beta_1} = \frac{\alpha_2}{\beta_2} = \frac{\alpha_3}{\beta_3} = \frac{\alpha_4}{\beta_4} = \frac{1}{10},$$

where the indices refer to the four different apertures at the detector/output plane 26. Although not implemented in this work, $$\frac{\alpha}{\beta}$$

ratios among different bands/channels can also be separately tuned to better compensate for the material losses as a function of wavelength. In general, to design an optical component that maintains the photon efficiency and Q-factor over K different bands based on the broadband diffractive optical network framework, a set of 2K coefficients, i.e., ($\alpha_1$, $\alpha_2$, . . . , $\alpha_K$, $\beta_1$, $\beta_2$, . . . , $\beta_K$), must be tuned according to the material dispersion properties for all the subcomponents of the loss function.

In the training phase, M=7500 frequencies were randomly sampled in batches of B=20, which is mainly limited by the GPU memory of the computer 100. The trainable variables, $h_p$ in Equation (4b), were updated following the standard error backpropagation method using Adam optimizer with a learning rate of $1 \times 10^{-3}$. The initial conditions of all the trainable parameters were set to be 0. For the diffractive network models with more than one detector 26 location, loss values were individually calculated for each detector 26 with a random order, and the design parameters were updated hereafter. In other words, for a d-detector optical system, loss calculations and parameter updates were performed d times with respect to each detector 26 in a random order.

The models were simulated using Python (v3.7.3) and TensorFlow (v1.13.0, Google Inc.). All the models were trained using 200 epochs (the network saw all the 7500 frequencies at the end of each epoch) with a GeForce GTX 1080 Ti Graphical Processing Unit (GPU, Nvidia Inc.) and Intel® Core™ i9-7900X Central Processing Unit (CPU, Intel Inc.) and 64 GB of RAM, running Windows 10 operating system (Microsoft). Training of a typical optical neural network 10 model takes ~5 hours to complete with 200 epochs. The thickness profile of each diffractive layer was then converted into an .stl file format using Matlab.

While embodiments of the present invention have been shown and described, various modifications may be made without departing from the scope of the present invention. For example, while the output of the optical neural network 10 described herein filters or de-multiplexes an input optical signal the reverse is also possible. That is to say, the plurality of substrate layers of the multi-layer transmissive and/or reflective network generate a single common multiplexed channel as an output from individually filtered or de-multiplexed input channels from an input optical signal (e.g., FIG. 9C). The invention, therefore, should not be limited, except to the following claims, and their equivalents.

What is claimed is:

1. An optical neural network device for processing a broadband input optical signal from a broadband light source comprising:

a plurality of optically transmissive and/or reflective substrate layers arranged in an optical path, each of the plurality of optically transmissive and/or reflective substrate layers comprising a plurality of physical features formed on or within the plurality of optically transmissive or reflective substrate layers and having different complex-valued transmission and/or reflection coefficients as a function of the lateral coordinates across each substrate layer, wherein the plurality of optically transmissive and/or reflective substrate layers and the plurality of physical features thereon collectively define a trained mapping function between the broadband input optical signal to the plurality of optically transmissive and/or reflective substrate layers and output optical signals created by optical diffraction through and/or optical reflection from the plurality of optically transmissive and/or reflective substrate layers;

one or more optical sensors configured to capture the output optical signals resulting from the plurality of optically transmissive and/or reflective substrate layers; and wherein the plurality of optically transmissive and/or reflective substrate layers generate wavelength de-multiplexed optical signals for the one or more optical sensors.

2. The optical neural network device of claim 1, wherein the broadband input optical signal comprises a broadband terahertz (THz) source, broadband visible source, or a broadband infrared source.

3. The optical neural network device of claim 1, wherein the plurality of physical features of the plurality of optically transmissive and/or reflective substrate layers comprise regions of varied thicknesses or regions having different optical properties.

4. The optical neural network device of claim 1, wherein the plurality of physical features of the plurality of optically transmissive and/or reflective substrate layers comprise metamaterials and/or metasurfaces.

5. The optical neural network device of claim 1, wherein the plurality of optically transmissive and/or reflective substrate layers are positioned within and/or surrounded by vacuum, air, a gas, a liquid or a solid material.

6. The optical neural network device of claim 1, wherein the plurality of optically transmissive and/or reflective substrate layers comprise a nonlinear optical material.

7. The optical neural network device of claim 1, wherein the plurality of optically transmissive and/or reflective substrate layers comprises one or more physical substrate layers that comprise reconfigurable physical features that can change on demand as a function of time.

8. A method of forming a multi-layer optical neural network for processing broadband light comprising:

training a software-based neural network to perform one or more specific optical functions for a multi-layer transmissive and/or reflective network having a plurality of optically diffractive physical features located in different locations in each of the layers of the transmissive and/or reflective network, wherein the training comprises feeding a plurality of different wavelengths of a broadband optical signal to the software-based neural network and computing at least one optical output of optical transmission and/or reflection through the multi-layer transmissive and/or reflective network using a wave propagation model and iteratively adjusting complex-valued transmission/reflection coefficients for each layer of the multi-layer transmissive and/or reflective network until optimized transmission/reflection coefficients are obtained or a certain time or epochs have elapsed; and manufacturing or having manufactured a physical embodiment of the multi-layer transmissive and/or reflective network comprising a plurality of substrate layers having physical features that match the optimized transmission/reflection coefficients obtained by the trained neural network.

9. The method of claim 8, wherein the optimized transmission/reflective coefficients are obtained by error backpropagation.

10. The method of claim 8, wherein the optimized transmission/reflection coefficients are obtained by deep learning.

11. The method of claim 8, wherein the physical embodiment of the multi-layer transmissive and/or reflective network is manufactured by additive manufacturing or lithography.

12. The method of claim 8, wherein the plurality of optically transmissive and/or reflective substrate layers forming the network are positioned within and/or surrounded by vacuum, air, a gas, a liquid or a solid material.

13. The method of claim 8, wherein the physical embodiment of the multi-layer transmissive and/or reflective network comprises one or more physical substrate layers that comprise a nonlinear optical material.

14. The method of claim 8, wherein the physical embodiment of the multi-layer transmissive and/or reflective network comprises one or more physical substrate layers that comprise reconfigurable physical features that can change on demand as a function of time.

15. The method of claim 8, wherein the physical embodiment of the multi-layer transmissive and/or reflective network filters a particular wavelength, a plurality of particular wavelengths, a set of wavelengths, or sets of wavelengths within a wavelength range of the broadband light source.

16. The method of claim 8, wherein the physical embodiment of the multi-layer transmissive and/or reflective network generates wavelength de-multiplexed optical signals for one or more optical sensors.

17. The method of claim 8, wherein the broadband input optical signal comprises a broadband terahertz (THz) source, a broadband visible source, or a broadband infrared source.

18. A method of processing a broadband input optical signal comprising:

providing an optical neural network device comprising:

a plurality of optically transmissive and/or reflective substrate layers arranged in an optical path, each of the plurality of optically transmissive and/or reflective substrate layers comprising a plurality of physical features formed on or within the plurality of optically transmissive or reflective substrate layers and having different complex-valued transmission and/or reflection coefficients as a function of the lateral coordinates across each substrate layer, wherein the plurality of optically transmissive and/or reflective substrate layers and the plurality of physical features thereon collectively define a trained mapping function between the broadband input optical signal to the plurality of optically transmissive and/or reflective substrate layers and output optical signals comprising wavelength de-multiplexed optical signals created by optical diffraction through and/or optical reflection from the plurality of optically transmissive and/or reflective substrate layers; and one or more optical sensors configured to capture the one or more output wavelength de-multiplexed optical signals resulting from the plurality of optically transmissive and/or reflective substrate layers; and inputting the broadband input optical signal into the optical neural network device.

\* \* \* \* \*